United States Patent
Tanahashi et al.

(10) Patent No.: US 8,027,074 B2
(45) Date of Patent: Sep. 27, 2011

(54) SCAN OPTICAL SYSTEM, LIGHT SCAN DEVICE, AND IMAGE FORMATION DEVICE

(75) Inventors: Daisuke Tanahashi, Hachioji (JP); Yayoi Eguro, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/746,322

(22) PCT Filed: Nov. 19, 2008

(86) PCT No.: PCT/JP2008/071010
§ 371 (c)(1), (2), (4) Date: Jun. 4, 2010

(87) PCT Pub. No.: WO2009/072398
PCT Pub. Date: Jun. 11, 2009

(65) Prior Publication Data
US 2010/0245959 A1    Sep. 30, 2010

(30) Foreign Application Priority Data
Dec. 7, 2007 (JP) .................................. 2007-317428

(51) Int. Cl.
G02B 26/08 (2006.01)
(52) U.S. Cl. ............... 359/205.1; 359/204.1; 359/207.1; 359/213.1; 359/215.1
(58) Field of Classification Search .... 359/196.1–226.2, 359/662; 347/225–261
See application file for complete search history.

(56) References Cited

U.S. PATENT DOCUMENTS
| | | | |
|---|---|---|---|
| 2005/0225879 A1* | 10/2005 | Ohta et al. | 359/722 |
| 2009/0016199 A1* | 1/2009 | Eguro | 369/112.23 |
| 2010/0074083 A1* | 3/2010 | Shibuya et al. | 369/100 |

FOREIGN PATENT DOCUMENTS
| | | |
|---|---|---|
| JP | 2001-249293 | 9/2001 |
| JP | 2002-365575 | 12/2002 |
| JP | 2004-29830 | 1/2004 |
| JP | 2006-171419 | 6/2006 |
| JP | 2006-313268 | 11/2006 |
| JP | 2007-314646 | 12/2007 |
| WO | WO 2005/073321 | 8/2005 |

\* cited by examiner

Primary Examiner — James Phan
(74) Attorney, Agent, or Firm — Cozen O'Connor

(57) ABSTRACT

An imaging lens good in mass-productivity, compact, low in manufacturing cost, good in aberration performance is provided by effectively correcting aberrations without greatly varying the variation of the thickness of a curing resin. An imaging device having such an imaging lens and a portable terminal are also provided. A third lens (L3) has a flat surface on the object side, a convex surface near the optical axis on the image side, and a concave aspheric surface around the peripheral portion within the region where a light beam passes. Therefore, it is possible to reduce the other optical aberrations such as distortion and simultaneously to design the imaging lens so that the astigmatism takes on a maximum value at the outermost portion. Hence, the resolutions at low to middle image heights are high. In addition, such a shape does not cause a large variation of the thickness of the third lens (L3) from the region along the axis to the periphery. Therefore, the thickness of the third lens (L3) can be small, and the material cost can be reduced.

17 Claims, 6 Drawing Sheets

SCAN OPTICAL SYSTEM, LIGHT SCAN DEVICE, AND IMAGE FORMATION DEVICE

RELATED APPLICATIONS

This is a U.S. National Phase Application under 35 U.S.C. 371 of International Application PCT/JP2008/071010, filed on Nov. 19, 2008.

This application claims the priority of Japanese Application No. 2007-317428 filed on Dec. 7, 2007, the entire content of which is hereby incorporated by reference.

TECHNICAL FIELD

The present invention relates to a scanning optical system, a light beam scanning device, and an image forming apparatus such as a laser printer, a digital copier, and a multifunction printer, which have high resolution by the use of a light flux with a wavelength of 500 nm or less, in particular, to a scanning optical system, a light beam scanning device, and an image forming apparatus, which are excellent in durability even by the use of a plastic lens capable of being manufactured at low cost.

TECHNICAL BACKGROUND

Generally, a light beam scanning device which is used for image forming apparatuses, such as a laser printer, a digital copier, and a multifunction printer, is adapted to deflect a light flux emitted from a laser light source by a deflecting optical system, such as a polygon minor and to form an image as a light spot on a scanned surface by a scanning imaging optical system.

As the laser light source, a semiconductor laser and the like are generally used. A divergent light flux emitted from the laser light source is converted in an almost parallel light beam by a collimator lens and the contour of the parallel light beam is shaped by an aperture. The light beam whose contour is shaped, is deflected by a deflecting optical systems, such as a polygon mirror rotating at a constant angular velocity, and enters a scanning imaging optical system. The scanning imaging optical system is required to have the fθ characteristic to make a light beam deflected with a constant angular velocity to scan at an equal distance velocity on a scanned surface arranged with a predetermined gap distance, and to have a field curvature corrected in good order so as to form a minute optical spot over all a scanning region.

In the case that a polygon minor is used for the deflecting optical system, since the polygon mirror has working errors on minor surfaces, an vibrations on a rotating shaft, and so on, many imaging lens systems are provided with an inclination correcting function to correct a deviation in a scanning position in a sub-scanning direction (a vertical scanning direction, a direction vertical to a main scanning direction). For this reason, an imaging lens system is made into an anamorphic lens system with which an imaging characteristic in a main scanning direction differs from that in a sub-scanning direction.

Further, conventionally, the above-mentioned scanning imaging optical system is manufactured with a glass material. However, since the processing of a glass lens is difficult and becomes a high cost, it is required in recent years to manufacture a lens by a plastic material with which the lens can be manufactured at a low cost can and is shaped in a free form so as to rectify an aberration.

Furthermore, conventionally, a semiconductor laser used as a light source is generally an infrared laser (a wavelength of about 780 nm) or a red laser (a wavelength of about 650 nm). However, these days, in response to a request to make a resolution more high, a light beam scanning device has been developed so as to obtain a minute spot configuration by the use of a short wavelength light source with, a wavelength of 500 nm or less. Moreover, recently, in response to a request to make a device in a compact size, it is required to make a polygon mirror and a plastic lens in a small size by the use of a short wavelength light source and by making the F-number of a scanning imaging optical system larger so as to make a beam diameter smaller.

However, in many optical materials used as a plastic lens, as a wavelength becomes shorter, the transmittance may become smaller due to internal absorption. In particular, in the case that a short wavelength light source with a wavelength of 500 μm or less is used, the transmittance reduces largely due to internal absorption. Moreover, it turns out that when a plastic lens is irradiated with a light beam having a short wavelength for a long time, there is a problem that the plastic lens causes white turbidity (or cloudy) so as to reduce more its transmittance.

For such a problem, as a light beam scanning device employing a light source with a wavelength of 500 nm or less, a light beam scanning device is proposed such that at least one lens of a scanning imaging optical system is made as a plastic lens (refer to Patent Document 1).

Furthermore, another light beam scanning device is proposed such that a light source with a wavelength of 450 nm or less is used, an optical system between the light source and a deflecting optical system is structured with optical elements made of glass, and a scanning imaging optical system is structured with optical elements made of plastic (refer to Patent Document 2). In this light beam scanning device, the optical elements through which a light flux passes continuously are made as optical elements made of glass, whereas the optical elements through which a light flux does not pass continuously are made as optical elements made of plastic, whereby the light beam scanning device is provided at a low cost Patent Document 1: U.S. Pat. No. 3,478,819 official report
Patent Document 2: Japanese Unexamined Patent Publication No. 2006-313268 official report

DISCLOSURE OF THE INVENTION

Problems to be Solved by the Invention

However, although Patent Document 1 discloses a technique to limit a difference in thickness of a plastic lens so as to reduce unevenness in light amount distribution due to internal absorption in the plastic lens, it does not take any countermeasure for reduction in transmittance due to the fact that a plastic lens causes white turbidity by being irradiated with a light beam with a short wavelength, and the reduction in transmittance may cause a problem.

Further, in the light beam scanning device described in the above-mentioned Patent Document 2, when the strength of a beam in a scanning optical system made in a compact size becomes high, the occurrence of white turbidity is also observed in optical elements in a scanning imaging optical system, and it is not sufficient to prevent white turbidity from occurring. Furthermore, for example, even in high speed scanning with multi beams, since a lens is irradiated with a strong light beam, it is not sufficient to prevent white turbidity from occurring.

Then, an object of the present invention is to provide a scanning optical system, a light beam scanning device and an image forming apparatus, which can suppress a transmittance from lowering due to white turbidity in addition to make a device in a compact size.

Means for Solving the Problems

The above-mentioned object of the present invention can be attained by the following structures.

The invention descried in item 1 is that in a scanning optical system which has a light source to emit a light flux with a wavelength of 500 nm or less, a deflecting optical system to deflect the light flux from the light source so as to scan in a main scanning direction, and a scanning imaging optical system to make the light flux deflected by the deflecting optical system to form an image on a scanned surface, the scanning optical system is characterized in that the scanning imaging optical system comprises at least a first plastic lens provided to adjoin the deflecting optical system and the scanning optical system satisfies the conditional formula:

$$0.05 \leq NA1 \cdot t1 \leq 1.5$$

where a numerical aperture of a light flux entering the deflecting optical system in a sub-scanning direction is $NA1$ and a distance between the deflecting optical system and the first plastic lens is $t1$ [mm]; and the first plastic lens is a lens including as a base material an alicyclic structure containing resin composed of a block polymer which includes a polymer block [A] containing a repeating unit [1] represented by the following Formula (1) and a polymer block [B] containing a repeating unit [1] represented by the following Formula (1) and a repeating unit [2] represented by the following Formula (2) and/or a repeating unit [3] represented by the following Formula (3), wherein the relationship between a molar fraction "a" (mole %) of the repeating unit [1] in the polymer block [A] and a molar fraction "b" (mole %) of the repeating unit [1] in the polymer block [B] is a>b.

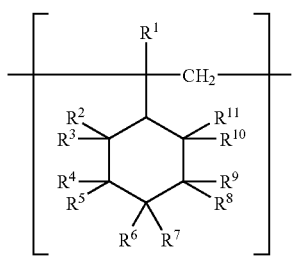

Formula 1

In the Formula 1, $R^1$ represents a hydrogen atom or an alkyl group having a carbon number of 1 to 20, $R^2$ to $R^{11}$ each independently represents a hydrogen atom, an alkyl group having a carbon number of 1 to 20, a hydroxyl group, an alkoxy group having a carbon number of 1 to 20 or a halogen group.

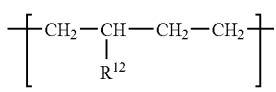

Formula 2

In the Formula 2, $R^{12}$ represents a hydrogen atom or an alkyl group having a carbon number of 1 to 20.

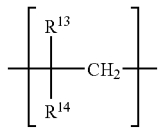

Formula 3

In the Formula 3, $R^{13}$ and $R^{14}$ each independently represents a hydrogen atom or an alkyl group having a carbon number of Ito 20.

The invention described in item 2 is characterized in the scanning optical system described in item 1 such that the scanning imaging optical system comprises a second plastic lens at a scanned surface side than the first plastic lens, the second plastic lens is a lens including as a base material the abovementioned alicyclic structure containing resin, and the scanning optical system satisfies the conditional formulas:

$$0.05 \leq t2/f1 \leq 0.4 \text{ and } f1 \leq 0$$

where a focal length of the first plastic lens in a main scanning is f1 [mm] and a gap between the first plastic lens and the second plastic lens is t2 [mm].

The invention described in item 3 is characterized in the scanning optical system described in item 2 such that in at least one of the first plastic lens and the second plastic lens, the configuration of a cross sectional surface parallel to the main scanning direction is left-right asymmetric.

The invention described in item 4 is characterized in the scanning optical system described in any one of items 1 to 3 such that the abovementioned alicyclic structure containing resin contains a light resistance stabilizing agent.

The invention described in item 5 is characterized in the scanning optical system described in any one of items 1 to 4 such that the scanning optical system satisfies the conditional formula:

$$0.1 \leq NA1 \cdot t1 \leq 1.$$

The invention described in item 6 is characterized in the scanning optical system described in item 2 such that the scanning optical system satisfies the conditional formula:

$$0.1 \leq t2/f1 \leq 0.25.$$

The invention described in item 7 is characterized in the scanning optical system described in any one of items 1 to 6 such that the scanning optical system satisfies the conditional formula:

$$0.25 \leq \Sigma d/f \leq 0.5,$$

where a focal length of the entire system of the scanning imaging optical system in the main scanning direction is f [mm] and a distance from the deflecting optical system to an optical surface of the scanning imaging optical system positioned closest to a scanned surface is $\Sigma d$ [mm].

The invention described in item 8 is characterized in the scanning optical system described in any one of items 1 to 7 such that the light source is a light source to emit two or more light fluxes.

The invention described in item 9 is characterized in the scanning optical system described in any one of items 1 to 8 such that in the first plastic lens, the configuration of a cross sectional surface parallel to the main scanning direction is left-right asymmetric.

The invention described in item 10 is characterized in the scanning optical system described in any one of items 1 to 9 such that the scanning optical system comprises an optical element in which a diffractive structure is provided on at least one optical surface thereof.

The invention described in item 11 is characterized in the scanning optical system described in any one of items 1 to 10 such that the deflecting optical system is constituted by a resonant minor which deflects a light flux from the light source by making a reflecting surface to cause a sine oscillation.

The invention described in item 12 is characterized in that an optical scanning apparatus comprises the scanning optical system described in any one of items 1 to 11.

The invention described in item 13 is characterized in that an image forming apparatus comprises the optical scanning apparatus described in item 12.

As a result of investigation by the present inventor, it turns out that in the case that a scanning imaging optical system including aplastic lens is employed, when a lens of the scanning imaging optical system positioned closest to the optical deflecting optical system is made as a first lens, since a beam converged once in the sub-scanning direction by the deflecting optical system in order to correct a surface inclination has an extremely strong power in the vicinity of the deflecting optical system, if the light is irradiated to the first lens, the first lens tends to cause white turbidity.

As a result of further investigation, it turns out that in the case that the first plastic lens includes as a base material the abovementioned alicyclic structure containing resin, a numerical aperture of a light flux entering the deflecting optical system in a sub-scanning direction is NA1, and a distance between the deflecting optical system and the fast plastic lens is t1 [mm], when a scanning optical system is adapted to satisfy the conditional formula: $0.05 \leq NA1 \cdot t1 \leq 1.5$, it is possible to obtain the scanning optical system exhibiting an excellent durability without causing the lowering of a transmittance due to white turbidity.

Herein, the distance t1 between the deflecting optical system and the fast plastic lens means the shortest distance of a main light ray hitting vertically to a scanned surface among light rays reflected by the deflecting optical system, that is, the shortest distance on the optical axis between the deflecting optical system and an optical surface of the first plastic lens at its deflecting optical system side.

Moreover, in the case that the scanning imaging optical system is made in a two lens structure having a second lens at the scanned surface side of the first lens, a preferable structure is that the second lens also includes as a base material the abovementioned alicyclic structure containing resin. Further, since the power in the main scanning direction is mainly held by the first lens, if the gap between the first lens and the second lens is too broad, in the result of converging light by the first lens, a light flux strong in strength per unit area is irradiated to the second lens. Accordingly, in order to minimize white turbidity in the second lens efficiently, a preferable structure is to satisfy the conditional formulas:

$$0.05 \leq t2/f1 \leq 0.4 \text{ and } f1 \geq 0.$$

Herein, the distance t2 between the first plastic lens and the second plastic lens means the shortest distance on the optical axis between an optical surface of the first plastic lens at its scanned surface side and an optical surface of the second plastic lens at its deflecting optical system side.

Effect of the Invention

According to the present invention, it becomes possible to make the apparatus in a compact size and to suppress the lowering of an transmittance due to white turbidity.

EXPLANATION OF REFERENCE SYMBOLS

1 Light Source Device (Light Source)
5 Deflecting Optical System
6 First Lens (First Plastic Lens)
7 Second Lens (Second Plastic Lens)
8 Scanning Imaging Optical System
50 Polygon Minor
50A Resonant minor
100 Light Beam Scanning Device
101 Scanning Optical System
200 Laser Printer (Image Forming Apparatus)
H Scanned surface

BEST MODE FOR IMPLEMENTING THE INVENTION

Hereafter, desirable embodiments of the present invention will be described with reference to drawings. In these embodiments, as an example of an image forming apparatus according to the present invention, a laser printer will be explained.

Figure 1:
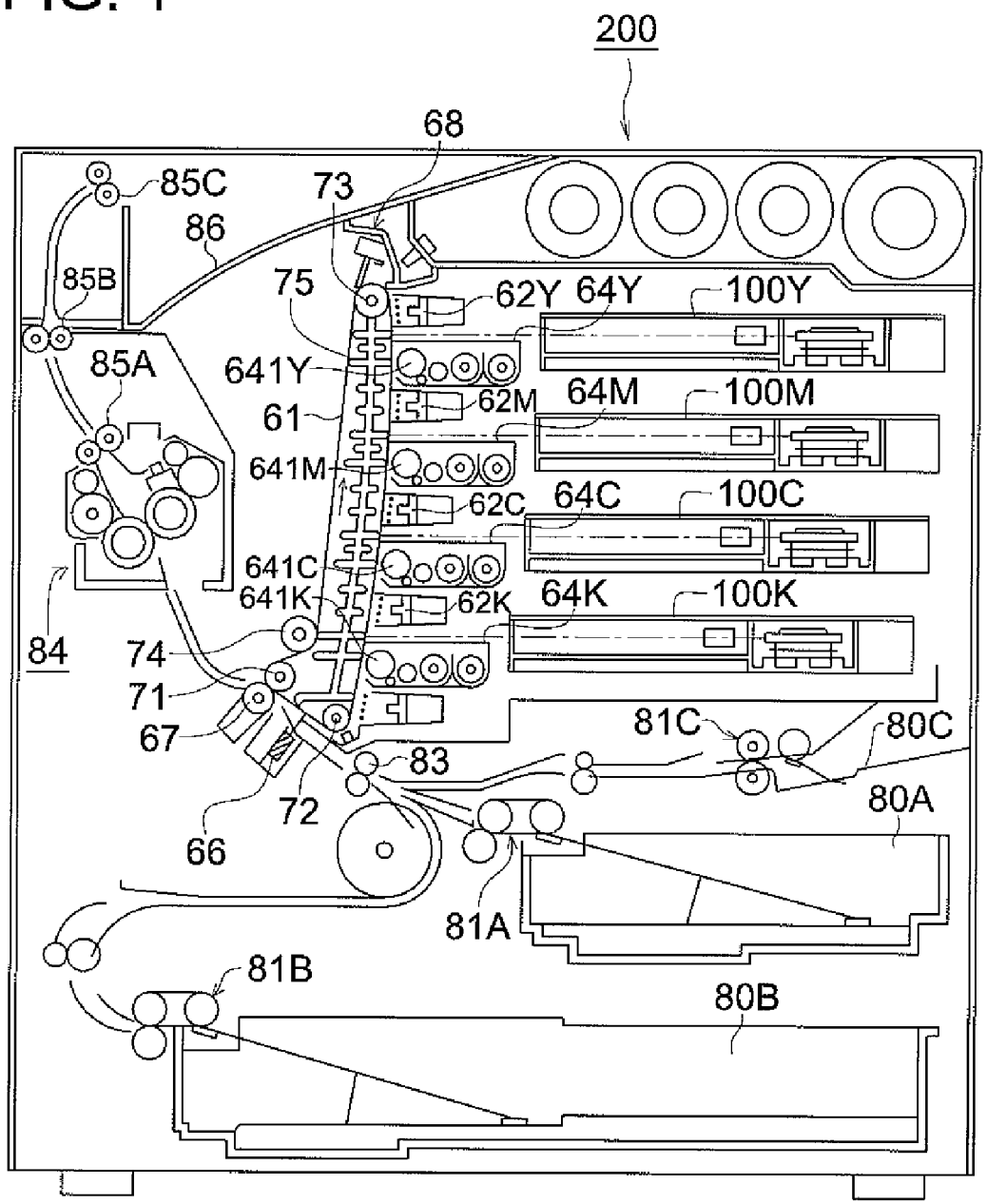
FIG. 1 is an outline structural view of a laser printer which is an example of an image forming apparatus employing a light beam scanning device equipped with a scanning optical system according to this embodiment.

FIG. 1 is a schematic structural diagram of a laser printer 200 that is an example of an image forming apparatus having a light beam scanning device equipped with a scanning optical system according to the present embodiment.

The laser printer 200 shown in FIG. 1 is capable of forming a color image and is of the type that a writing section and a developing section are provided for each of blue, green, red and black separately, and the writing section is provided with four light beam scanning devices each equipped with the scanning optical system relating to the present embodiment.

The laser printer 200 of the present example superimposes a toner image of each color sequentially on an image carrying member, and then, transfers the superimposed toner images onto a recording sheet at a time in the transfer section so as to form a color image.

Plural sets (four sets in FIG. 1) of image forming units composed of scorotron charging devices (hereinafter referred to as charging device) 62Y, 62M, 62C and 62K, light beam scanning devices 100Y, 100M, 100C and 100K and developing devices 64Y, 64M, 64C and 64K are arranged serially around a flexible endless belt type photoreceptor (hereinafter referred to a belt type photoreceptor) 61 representing an image carrying member. A scanning optical system is provided in the inside of each of the light beam scanning devices 100Y, 100M, 100C and 100K.

The belt type photoreceptor 61 is stretched around a driving roller 71 and rotating rollers 72 and 73, made to be in a tensile state by the action of a tension roller 74, and rotated clockwise as illustrated, while coming locally in contact with a back-up member 75 provided in its inner circumferential surface. The back-up member 75 comes in contact with a rear surface of the belt type photoreceptor 61 so as to regulate developing regions of developer carrying members (hereinafter referred to as developing sleeves) 641 (Y, M, C and K) and image forming positions of the light beam scanning devices 100 (Y, M, C and K).

When an image formation is stated, a driving motor rotates so as to rotate the belt type photoreceptor 61 clockwise as illustrated through the driving roller 71, and the charging device 62Y starts providing an electric potential to the belt type photoreceptor 61 by its charging action. After the belt type photoreceptor 61 is provided with the electric potential, the light beam scanning device 100Y starts exposure in response to electric signals corresponding to the first color signals, namely, yellow (Y) image signals so that an electrostatic latent image corresponding to an yellow (Y) image is formed on a light-sensitive layer on the surface of the belt type photoreceptor 61 by the rotation (sub-scanning) of the belt type photoreceptor 61. This latent image is developed by the developing device MY with a reversal development under a non-contact state of developer adhering on the developing sleeve 641Y representing the developer carrying member so that an yellow (Y) color toner image is formed by one rotation of the belt type photoreceptor 1.

Next, the belt-type photoreceptor 61 is further provided with an electric potential on the yellow (Y) color toner image by the charging action of the charging device 62M, then, the light beam scanning device 100M conducts exposure in response to electric signals corresponding to the second color signals, namely, magenta (M) image signals so as to form a latent image, and the latent image is developed by the developing device 64M with a reversal development under a non-contact state of developer so that a magenta (M) color toner image is formed and superposed on the above-mentioned yellow (Y) color toner image.

With the same process, a cyan (C) color toner image corresponding to the third color signals is further formed by the charging device 62C, the light beam scanning device 100C and the developing device 64C. Further, a black (K) color toner image corresponding to the fourth color signals is successively formed and superimposed by the charging device 62K, the light beam scanning device 100K and the developing device 64K, thus, a color toner image is formed on the circumferential surface of the belt type photoreceptor 61 within one rotation thereof.

At the time of the developing operations by the developing devices 64Y, 64M, 64C and 64K, a DC bias having the same polarity as the charged electric potential of the belt type photoreceptor 61, or a developing bias in which an AC bias is added to a DC bias, is applied onto each of the developing sleeves 641Y, 641M, 641C and 641K so that the non-contact reversal development is conducted with a two-component type developer adhering on each of the developing sleeves 641 (Y, M, C and K), whereby toner is made to adhere on the exposed portion on the belt type photoreceptor 61 in which a conductive layer is grounded.

Further, in the color toner images formed on the circumferential surface of the belt type photoreceptor 61, the electric potential of the adhering toners is made uniform by a charging device, and then is eliminated by a pre-transfer exposing device. Thereafter, at the transfer section, the color toner images are transferred onto a transfer sheet by a transfer device (transfer roller) 67. Herein, the transfer sheet is fed out from one of sheet feed cassettes 80A, 8013 and a manual feeding section 80C by one of sheet feeding devices 81A, 81B and 81C representing a sheet feeding device, conveyed to paired registration rollers 83, and further conveyed to the transfer section by the paired registration rollers 83 in synchronization with the color toner images formed on the belt type photoreceptor 61. Further, the transfer device 67 is arranged opposite to the lower part of the driving roller 71 for driving the belt type photoreceptor 61.

A photo-sensor 66 is arranged at a predetermined position that faces a part of the belt-type photoreceptor 61 stretched around the drive roller 71 and the rotating rollers 72 at a middle point between the paired registration rollers 83 and the transfer rollers 67. The photo-sensor 66 is used to detect a joint portion of the belt-type photoreceptor 61 and a registration mark formed on the belt-type photoreceptor 61, and is a sensor composed of one set of a light emitting section and a light receiving section.

The transfer material (transfer sheet) onto which the color toner image transferred, is separated from the circumferential surface of the belt type photoreceptor 61 that is shaped to follow a curvature of the drive roller 71, and then, conveyed to the fixing device 84. In the fixing device 84, the transfer material is heated and applied with a pressure so that the toner is fused and fixed on the transfer sheet. Thereafter, the transfer sheet is ejected from the fixing device 84, conveyed by sheet discharging rollers 85A, 85B and 85C, and discharged onto a sheet discharging tray 86 provided at the upper portion with the toner image surface on the transfer sheet facing downward.

FIG. 1 shows the laser printer 200 in which the image carrying member is a single belt type photoreceptor 61. However, it is also possible to provide four photoreceptor drums corresponding to four colors as the image carrying member.

Figure 2:
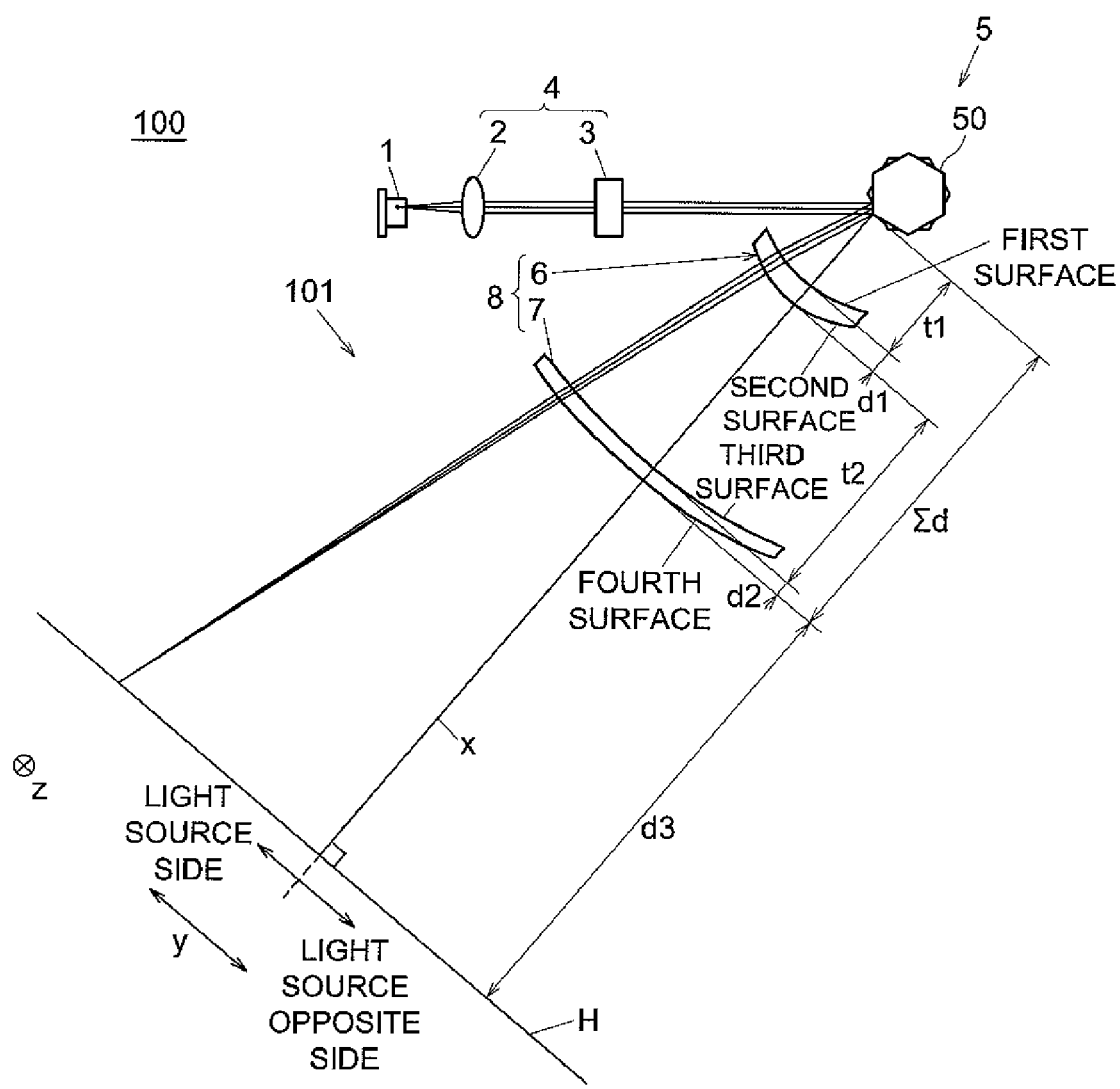
FIG. 2 is a drawing showing an example of a scanning optical system arranged in a light beam scanning device.

FIG. 2 is a drawing showing an example of a scanning optical system 101 arranged in the light beam scanning device 100.

As shown in FIG. 2, in the light beam scanning device 100, provided is a scanning optical system 101 to make a laser beam to scan in a main scanning direction y, and this scanning optical system 101 comprises a light source device 1, a line image forming optical system 4, a deflecting optical system 5, and a scanning imaging optical system 8.

Among these, the light source device 1 emits a light flux with a wavelength of 500 nm or less. The line image forming optical system 4 is constituted by a collimator lens 2 and a cylindrical lens 3, and converges a light flux from the light source device 1 as a line image being long in a main scanning correspondence direction y1 onto the deflecting optical system 5. The term "main scanning correspondence direction y1" here means a direction corresponding to a main scanning direction y, and in this embodiment, it is a direction perpendicular to an optical axis direction x and a sub-scanning direction (vertical scanning direction) z (a direction of a rotating shaft of a polygon mirror).

The deflecting optical system 5 has a polygon mirror 50 to deflect a light flux from the light source device 1.

This polygon mirror 50 has a deflecting reflective surface in the vicinity of an image forming position of a line image by the line image forming optical system 4, and is adapted to reflect a light flux from the line image forming optical system 4, to deflect it at an equal angular velocity, and to make it scan in a main scanning direction y by rotating the reflective surface around a center formed at a rotating shaft parallel to a sub-scanning direction. Here, in a plane vertical to the main scanning direction y, the reflective surface of the polygon mirror 50 and a scanned surface H are in a conjugate relation in the sense of geometrical optics.

The scanning imaging optical system 8 converges a light flux deflected by the polygon mirror 50 toward a scanned surface H so as to form an optical spot on the scanned surface H, and is subjected to an aberration correction such that the deflected light flux scans at a constant velocity on the scanned surface H. This scanning imaging optical system 8 comprises a first lens 6 and a second lens 7 sequentially from the polygon mirror 50 side.

The first lens 6 is arranged in adjacent to the polygon mirror 50, and is a positive meniscus lens with a concave surface facing the polygon mirror 50 side. This first lens 6 may have a configuration, for example, a ring-shaped configuration showing different power as the position on the first lens 6 separates from an optical axis in the main scanning direction y.

The second lens 7 is made a lens which has an anamorphic surface on at least one surface thereof.

Figure 3A:
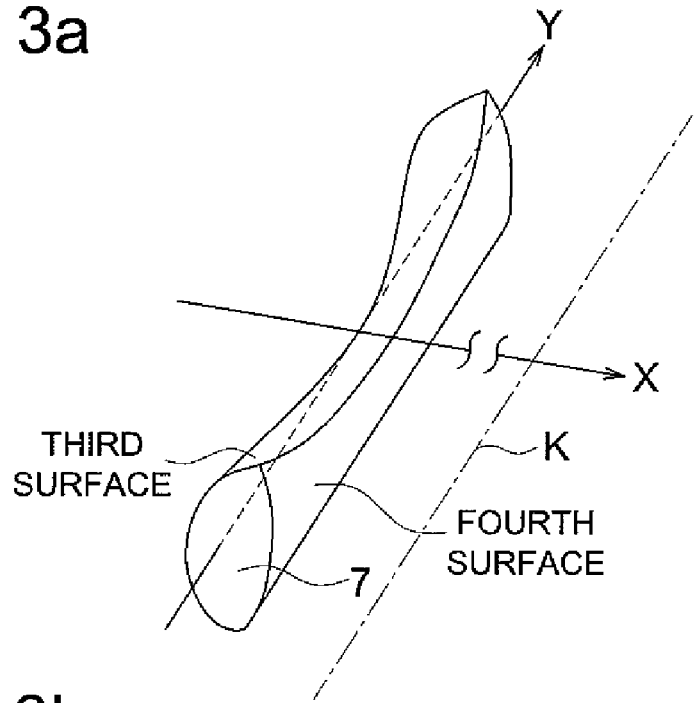
FIG. 3 is a drawing showing a second lens, and (a) is a perspective view and (b) is a cross sectional view on an X-Y plane.
Figure 3B:
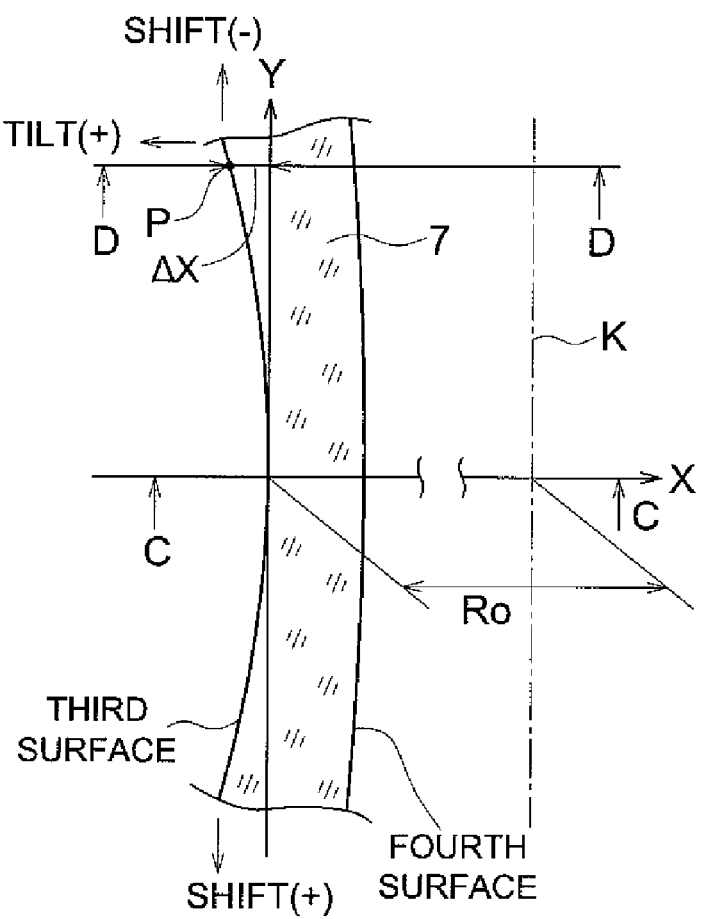

FIGS. 3(a) and 3(b) are explanatory diagrams in the case that an optical surface of the second lens 7 at the light source side, that is, the third surface in the scanning imaging optical system 8 (refer to FIG. 2) is made to an anamorphic surface.

As shown in FIG. 3, the definition is made such that a main light ray colliding vertically to a scanned surface H among light rays reflected by the polygon mirror 50, that is, an optical axis of the scanning imaging optical system 8 is made as "reference axis X"; an axis which passes through a cross point between the reference axis X and an anamorphic surface, is vertical to the reference axis X and is parallel to the main scanning direction y is made "Y axis"; and an axis which is vertical to both the reference axis X and the Y axis is made "Z axis". On the above definition, the anamorphic surface of the second lens is a surface formed by rotating around a center formed at a position of an axis line K located apart by a radius of curvature from a cross sectional plane in a sub-scanning direction z on the reference axis x.

More in detail, as shown in FIG. 3 (b), in this anamorphic surface, a shift length ΔX of a point P of an off axis region from the Y axis is represented by the following "Formula (i)".

$$\Delta X = \frac{Y^2/R}{1+\sqrt{1-(K+1)Y^2/R^2}} + \sum_{j=1}^{n} A_j Y^{\alpha j} \quad \text{(i)}$$

Where, R represents a radius of curvature, K represents a conic constant, Aj represents an aspheric surface coefficient and αj represents an aspheric surface order.

Figure 4A:
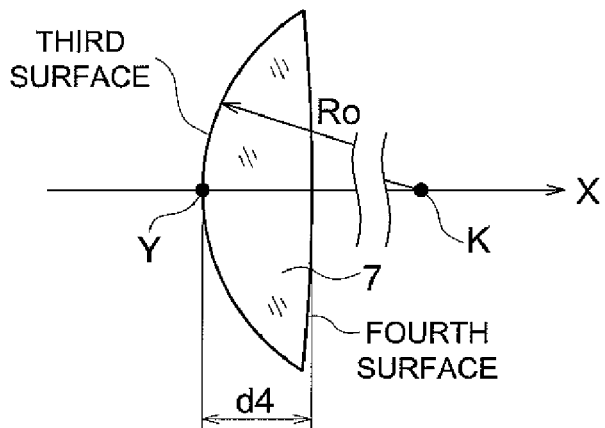
FIG. 4 is a schematic diagram showing a configuration of a cross sectional plane which intersects perpendicularly with Y-axis of the second lens.
Figure 4B:
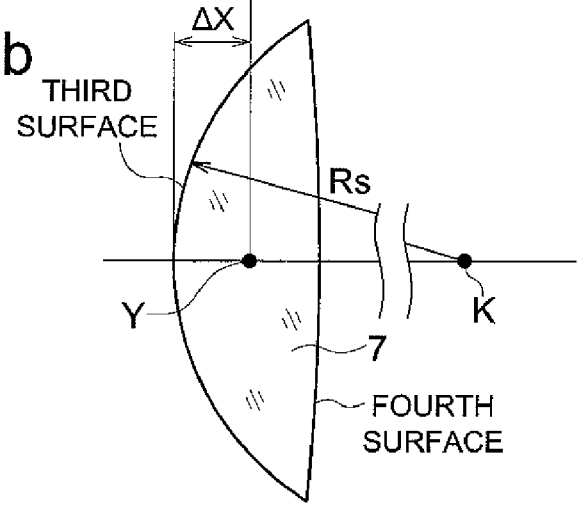

FIG. 4 is a schematic diagram showing a configuration of a cross sectional plane of the second lens 7 which intersects perpendicularly with the Y axis. FIG. 4(a) shows a cross sectional plane cut at a C-C line (on the X-axis) shown in FIG. 3(b), and FIG. 4(b) shows a cross sectional plane cut at a D-D line shown in FIG. 3 (b).

As shown in the above drawing (a), in the third surface of the second lens 7, a cross sectional plane in the sub-scanning direction which intersects perpendicularly with the Y axis on the X axis is an approximately arc shape having a radius $R_0$ around a center formed at a position on the axis line K. Further, as shown in the above drawing (b), in the third surface of the second lens 7, a cross sectional plane in the sub-scanning direction which intersects perpendicularly with the Y axis on an off axis point P separating by Y from the X axis is an approximately arc shape having a radius $R_s$ around a center formed at a point on the axis line K. That is, the radius of curvature Rs on the Z-X plane of an anamorphic surface is determined depending on a distance between the axis line K and the anamorphic surface, and satisfied the following Formula (ii).

$$R_S = R_0 - \Delta X \quad \text{(ii)}$$

Here, $R_0$ represents a radius of curvature in a Z-X plane including the reference axis X, and a radius of curvature $R_s$ changes as a position separates from the reference axis X.

The above-mentioned anamorphic surface is made in the form of circular arc or non-circular arc on the Z-X plane. When this curve is made into a suitable configuration, an image field in the sub-scanning direction z can be rectified from a center section, through an intermediate section to a peripheral section on an image screen, so that an almost uniform light beam diameter can be obtained in the sub-scanning direction z on the image field.

Further, in a lens having such an anamorphic surface, as shown in FIG. 3 (b), an optical surface may be shifted and/or tilted for the reference axis X. Furthermore, the configuration of the anamorphic surface is not restricted to the above Formula (1), and the anamorphic surface is made in other configurations (for example, free curved surface) such that its radius of curvature in the sub-scanning direction z is changed independently of the main scanning direction y as its position separates from the reference axis X. Moreover, an anamorphic surface may be provided also onto the first lens 6.

Further, at least one of the above-mentioned first lens 6 and second lens 7 may have an optical surface being left-right asymmetric for a center line on a cross sectional plane parallel to the main scanning direction y between the light source device 1 side and the opposite side (refer FIG. 2). In this case, even if a reflecting surfaces shifts with the rotation of the polygon mirror 50, it becomes possible to prevent image field curvature (particularly, image field curvature in the sub-scanning direction z) caused by the shift of the reflecting surface from becoming left-right asymmetric for the Z axis.

The first lens 6 and second lens 7 may have a diffractive structure on at least one optical surface thereof. Here, as compared with glass lenses, in resin lenses, the change of refractive index due to a change in environmental temperature or wavelength of a light source is large, and an image field position and a magnification changes due to the change of refractive index, and causes image deterioration. In particular, as compared with infrared wavelength or red wavelength, in a light source wavelength of 500 nm or less, the change of refractive index of a lens due to a change in wavelength is larger, and its influence is not negligible. In terms of this point, if the first lens 6 and second lens 7 have a diffractive structure on at least one optical surface thereof even if the first lens 6 and second lens 7 are made of resin, out-of-focus at the image field position due to a refractive index change caused by a temperature change can be suppressed.

On the assumption that a numerical aperture (NA) of a light flux entering the polygon mirror 50 in the sub-scanning direction z is NA1 and a distance from the polygon mirror 50 to the fast lens 6 is t1 [mm], the above scanning optical system 101 is adapted to satisfy the conditional formula:

$0.05 \leq NA1 \cdot t1 \leq 1.5$, preferably, $0.1 \leq NA1 \cdot t1 \leq 1$, and more preferably, $0.5 \leq NA1 \cdot t1 \leq 1$.

As with the light beam scanning device 100 in this embodiment, in a device in which scanning is conducted by the deflecting optical system 5 such as the polygon mirror 50 and the like, a long slender light flux being compressed in the sub-scanning direction by the line image forming optical system 4 is converged so as to enter the polygon mirror 50 in order to correct a surface inclination. Therefore, if the distance between the polygon mirror 50 and the first lens 6 is shorter, a light flux immediately after being reflected by the polygon mirror 50 (a light flux having a strong power immediately after being converged in the sub-scanning direction z) enters the first lens. As a result, the first lens 6 causes white turbidity.

In terms of this point, as described above, the scanning optical system 101 is adapted to satisfy the conditional formula: $0.05 \leq NA1 \cdot t1 \leq 1.5$, and a plastic material mentioned later is used for the first lens 6, whereby it become possible to prevent the first lens 6 from causing a white turbidity.

If $NA1 \cdot t1 < 0.05$, the distance between the polygon minor 50 and the first lens 6 of the scanning imaging optical system 8 becomes narrow. As a result, since a light flux having a strong strength per a unit area passes through the first lens 6, the first lens 6 tends to cause a white turbidity easily. On the other hand, if $1.5 < NA1 \cdot t1$, although the first lens 6 tends to cause a white turbidity hardly, a lens becomes a large size and the entire body of the scanning optical system 101 becomes larger.

On the assumption that the focal length of the first lens 6 in the main scanning is f1 [mm] and the gap between the first lens 6 and the second lens 7 is t2 [mm], the scanning imaging optical system 8 is adapted to satisfy the conditional formula:

$$0.05 \leq t2/f1 \leq 0.4 \text{ and } f1 \geq 0, \text{ and}$$

preferably, $$0.1 \leq t2/f1 \leq 0.25.$$

As with the scanning optical system 101 in this embodiment, in a device in which a two lens structure is used in the scanning imaging optical system 8, a power (refracting power) in the main scanning direction y is mainly held by the first lens 6 at the polygon mirror 50 side, and a light flux compressed by this first lens 6 is made to enter the second lens 7 at the image field side. Therefore, if the beam intensity (light amount per unit area) is strong the second lens 7 causes white turbidity by the irradiation for a longtime.

In terms of this point, as described above, since the scanning imaging optical system 8 is adapted to satisfy the conditional formulas: $0.05 \leq t2/f1 \leq 0.4$ and $f1 \geq 0$, it become possible to prevent the second lens 7 from causing white turbidity.

If $04 < t2/f1$, the gap between the first lens 6 and the second lens 7 becomes larger. As a result, since a light flux having a strong strength per a unit area by being compressed by the first lens 6 passes through the second lens 7, the second lens 7 tends to cause a white turbidity easily. On the other hand, if $t2/f1 < 0.05$, it becomes difficult to perform a be optical function such as compatibility to satisfy both an equal velocity scanning ability and a good image field curvature characteristic, and a lens becomes a large size and the entire body of the imaging optical system becomes larger.

On the assumption that a focal length of the entire system of the scanning imaging optical system 8 in the main scanning direction is f [mm] and a distance from the polygon mirror 50 to an optical surface positioned closest to a scanned surface H in the scanning imaging optical system 8 (in this embodiment, a scanned surface H side optical surface of the second lens 7) is Σd [mm], the scanning imaging optical system 8 is adapted to satisfy the conditional formula:

$$0.25 \leq \Sigma d/f \leq 0.5.$$

With this, the entire body of the scanning imaging optical system 8 can be made in compact and the manufacturing cost can be suppressed. Moreover, the uneven thickness ratio between a central portion and a periphery portion in the first lens 6 and the second lens 7 can be minimized. Therefore, different from the case that the uneven thickness ratio is large, it becomes possible to prevent a light amount from becoming different for each imaging position, thereby preventing a resultant image from becoming uneven.

If $0.5 < \Sigma d/f$, the lens in the entire body of the scanning imaging optical system 8 becomes a large size. Further, since the uneven thickness ratio in the first lens 6 and the second lens 7 becomes large, a lens passage distance becomes different between a light ray passing a lens center portion and a light ray passing a lens periphery portion. As a result, light amount unevenness is caused among light rays having reached a scanned surface H. In particular, in the case that a light flux having a wavelength of blue type is used and a resin lens is used as the first lens 6 and the second lens 7, since the internal absorption rate of the lens is high, the abovementioned problems become remarkable. Further, if $\Sigma d/f < 0.25$, it becomes difficult to perform a basic optical function such as compatibility to satisfy both an equal velocity scanning ability and a good image field curvature characteristic.

Subsequently, the material of the first lens 6 and the second lens 7 will be explained.

Among the first lens 6 and the second lens 7, the material of at least a base material of the first lens 6 is a plastic material, and preferably the material of a base material of the second lens 7 is also a plastic material.

Here, the plastic material of these first lens 6 and second lens 7 includes a resin containing an alicyclic structure as a base resin material.

This alicyclic structure containing resin is a block polymer which includes a polymer block [A] containing a repeating unit [1] represented by the following Formula (1) and a polymer block [B] containing a repeating unit [1] represented by the following Formula 1 and a repeating unit [2] represented by the following Formula (2) and/or a repeating unit [3] represented by the following Formula (3), wherein the relationship between a molar fraction "a" (mole %) of the repealing unit [1] in the polymer block [A] and a molar fraction "b" (mole %) of the repeating unit [1] in the polymer block [B] is a>b.

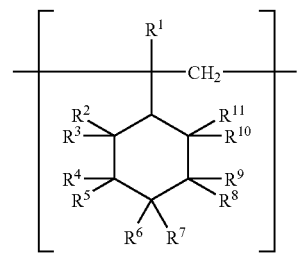

Formula 1

In the Formula 1, $R^1$ represents a hydrogen atom or an alkyl group having a carbon number of 1 to 20, $R^2$ to $R^{11}$ each independently represent a hydrogen atom, an alkyl group having a carbon number of 1 to 20, a hydroxyl group, an alkoxy group having a carbon number of 1 to 20 or a halogen group.

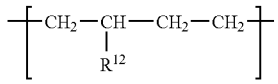

Formula 2

In the Formula 2, $R^{12}$ represents a hydrogen atom or an alkyl group having a carbon number of 1 to 20.

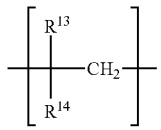

Formula 3

In the Formula 3, $R^{13}$ and $R^{14}$ each independently represents a hydrogen atom or an alkyl group having a carbon number of 1 to 20.

The preferable repeating unit [1] represented by a Formula 1 has a structure in which $R^1$ represents a hydrogen atom or a methyl group, and, $R^2$ to $R^{11}$ each represents a hydrogen atom. When the content of the repeating unit [1] in the polymer block [A] is in the abovementioned range, the transparency and mechanical strength are made superior. In the polymer block [A], the remaining part other than the repeating unit [1] is a hydrogenated repealing unit derived from a chain conjugated diene or a chain vinyl compound.

The polymer block [B] contains the repeating unit [1] and a repeating unit [2] represented by the Formula 2 and/or a repeating unit [3] represented by the formula 3. The content of the repeating unit [1] in the polymer block [B] is preferably from 40 to 95 mole % and more preferably from 50 to 90 mole %. When the content of the repeating unit 1 is within the abovementioned range, the transparency and mechanical strength are made superior. When the molar fraction of the repeating unit [2] in the polymer block [B] is m2 (mole %) and the molar fraction of the repeating unit [3] in the polymer block [B] is m3 (mole %), (2×m2+m3) is preferably 2 mole % or more, more preferably from 5 to 60 mole %, and most preferably from 10 to 50 mole %.

In a preferable structure of the repeating unit [2] represented by Formula 2, $R^{12}$ is a hydrogen atom or a methyl group. In a preferable structure of the repeating unit [3] represented by Formula 3, $R^{13}$ is a hydrogen atom, and $R^{14}$ is a methyl group or an ethyl group.

When the content of the repeating unit [2] or [3] in the polymer block [B] is too small, the mechanical strength may be lowered. Therefore, it is preferable that the contents of the repeating unit 2 and the repeating unit [3] are within the above range, because the transparence and the mechanical strength are made superior. The polymer block [B] may further contain a repealing unit [X] represented by the following Formula X. The content of the repeating unit [X] is to be within the range in which the characteristics of the block copolymer of the embodiment are not failed and preferably 30 mole % or less and more preferably 20 mol % or less to the whole of the block copolymer,

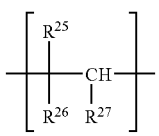

Formula X

In Formula X, $R^{25}$ is a hydrogen atom or an alkyl group having 1 to 20 carbon atoms, $R^{26}$ is a nitro group, an alkoxycarbonyl group, a formyl group, a hydroxycarbonyl group or a halogen group, and $R^{27}$ is a hydrogen atom. $R^{26}$ and $R^{27}$ may be bonded with each other to form an acid anhydride or an imido group.

In the block copolymer to be used in the embodiment, the molar fraction "a" of the repeating unit [1] in the polymer block [A] and the molar fraction "b" of the repeating unit [1] in the polymer block [B] preferably satisfy the relation of "a">"b". The transparency and mechanical strength are improved by such the condition.

When the mole number of the whole repeating units constituting the block [A] is "ma" and the mole number of the whole repeating units constituting the block [B] is "mb", the ratio of ("ma":"mb") is preferably from 5:95 to 95:5, more preferably from 30:70 to 95:5, and particularly preferably from 40:60 to 90:10. The transparency and mechanical strength are made superior when the ratio of ("ma":"mb") is within the above range.

The molecular weight of the block copolymer to be used in the embodiment is preferably from 10,000 to 300,000, more preferably from 15,000 to 250,000, and particularly preferably from 20,000 to 200,000 in terms of conversion weight average molecular weight, hereinafter referred to as Mw, of polystyrene (or polyisoprene) measured by gel permeation chromatography, hereinafter referred to as GPC, using tetrahydrofuran as the solvent.

The plastic material is made superior in balance among the mechanical strength, thermal resistivity and molding suitability when the Mw of the block polymer is within the above range. The molecular weight distribution of the block copolymer represented by the ratio (Mw/Mn) of the Mw in terms of polystyrene (or polyisoprene) to the number average, hereinafter referred to as Mn, is preferably not more than 5, more preferably not more than 4, and particularly preferably not more than 3 though the molecular weight distribution may be suitably selected according to the purpose of use. The plastic material is made superior in the mechanical strength and heat resistivity when the Mw/Mn is within the above range.

The glass transition temperature, hereinafter referred to as Tg, of the block copolymer may be suitably elected according to the purpose of use, and is preferably from 70 to 200° C., more preferably from 80 to 180° C., and particularly preferably from 90 to 160° C., in terms of the measured value on the high temperature side by the differential scanning calorimeter, hereinafter referred to as DSC.

The block copolymer to be used in the embodiment may have the polymer blocks [A] and [B]. The block copolymer may be a ([A]-[B]) type diblock copolymer, a tri-block copolymer such as ([A]-[B][A]) or ([B]-[A]-[B]) or a copolymer in which four or more in total of the polymer blocks [A] and [B] are alternatively linked. Further, the block copolymer may be a block copolymer in which these blocks are bonded in a radial form.

The alicyclic structure containing resin to be used in the embodiment can be obtained by the following methods. In a method, a monomer mixture of an aromatic vinyl compound and/or an alicyclic vinyl compound having an unsaturated bond in a ring thereof and a monomer mixture containing a vinyl monomer other than the aromatic vinyl compound and the alicyclic vinyl compound are polymerized so as to obtain a block copolymer including a polymer block containing a repeating unit derived from the aromatic vinyl compound and/or the alicyclic vinyl compound and a polymer block containing a repeating unit derived from the vinyl monomer.

Then, an aromatic ring and/or an alicyclic ring of the resultant block copolymer are hydrogenated. Further, in another method, a monomer mixture containing a saturated alicyclic vinyl compound and a monomer mixture containing a vinyl monomer other than the aromatic vinyl compound and the alicyclic vinyl compound are polymerized to obtained a block copolymer including a polymer block containing a repeating unit derived from the alicyclic vinyl compound and a polymer block containing a repeating unit derived from the vinyl monomer. Specifically, a block copolymer more preferably usable in the embodiment can be produced by the following methods, for example.

(1) As a first method, firstly, a monomer mixture [a'] containing 50 mole % or more of an aromatic vinyl compound and/or an alicyclic vinyl compound having an unsaturated bond in axing thereof is polymerized to obtain a polymer block [A'] containing a repeating unit derived from the aromatic vinyl compound and/or the alicyclic vinyl compound.

A monomer mixture [b'] containing not 2 mole % or more of a vinyl type monomer other than an aromatic vinyl compound and an alicyclic vinyl compound and containing an aromatic compound and/or an alicyclic compound having an unsaturated bond in a ring thereof in an amount with a ratio smaller than that in the monomer mixture [a'] is polymerized to obtain a polymer block [B'] containing a repeating units derived from the aromatic vinyl compound and/or the alicyclic vinyl compound and a repeating units derived from the vinyl type monomer.

After at least these processes are conducted, a block copolymer containing the polymer blocks [A'] and [B'] is obtained, and thereafter, the aromatic ring and/or the alicyclic ring of the block copolymer are hydrogenized.

(2) As a second method, a monomer mixture [a] containing 50 mole % or more of a saturated alicyclic vinyl compound is polymerized to obtain a polymer block [A] containing a repeating units derived from the saturated alicyclic vinyl compound. A monomer mixture [b] containing 2 mole % or more of a vinyl type monomer other than an aromatic vinyl compound and an alicyclic vinyl compound and containing a saturated alicyclic vinyl compound in an amount with a ratio smaller than that in the monomer mixture [a] is polymerized to obtain a polymer block [B] containing a repeating units derived from the saturated alicyclic vinyl compound and a repeating units derived from the vinyl type monomer.

After at least these processes are conducted, a block copolymer containing the polymer blocks [A] and [B] is obtained.

Among the above methods, the method (1) is preferable from the viewpoint of availability of the monomer, yield of polymerization and easiness in introducing the repeating unit [1] to the polymer block [B'].

Specific examples of the aromatic vinyl compound in the method (1), include styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlrostyrene, dichlorostyrene, monofluorostyrene, 4-phenylstyrene and their derivatives having a substituent such as a hydroxyl group and alkoxyl group. Among them, styrene, 2-methylstyrene, 3-methylstyrene and 4-methylstyrene are preferable.

Specific examples of the unsaturated alicyclic vinyl compound in the method (1) include cyclohexenylethylene, α-methylcyclohexenyl-ethylene, α-t-butylcyclohexenylethylene and their derivative having a substituent such as a halogen atom, an alkoxy group and a hydroxyl group.

These aromatic vinyl compounds and the alicyclic vinyl compounds may be used solely or in combination of two kinds of them. It is preferable in the embodiment that the aromatic vinyl compound is used in both of the monomer mixtures of [a'] and [b'] and styrene or α-methylstyrene is preferably used among them.

The vinyl type monomer to be used in the above method includes a chain vinyl compound and a chain conjugated diene compound.

Specific examples of the chain vinyl compound, include a chain olefin monomer such as ethylene, propylene, 1-butene, 1-pentene and 4-methyl-1-pentene. Among them, the chain olefin monomer is preferable and ethylene, propylene and 1-butene are most preferable. Examples of the chain conjugated diene include, for instance, 1,3-butadiene, isoprene, 2,3-dimethyl-1,3-butadiene, 1,3-pentadiene and 1,3-hexadiene.

Among the chain vinyl compound and the chain conjugated diene, the chain conjugated diene is preferable and butadiene and isoprene are particularly preferable. These chain vinyl compounds and the chain conjugated diene compounds may be used solely or in combination of two or more kinds of them.

Any method such as radical polymerization, anion polymerization and cation polymerization may be applied for polymerization of the monomer mixture containing the above monomers and the anion polymerization is preferable and anion living polymerization in the presence of an inactive solvent is most preferable.

The anion polymerization is carried usually out within the range of from 0 to 200° C., preferably from 20 to 100° C., and particularly preferably from 20 to 80° C. in the presence of a polymerization initiator. As the polymerization initiator, a mono-organic lithium compound such as n-butyllithium, sec-butyllithium, t-butyllithium and hexyllithium, and a polyfunctional organic lithium compound such as phenyllithium, dilithiomethane and 1,4-diobutane,1,4-dilithio-2-ethylcyclohexane are usable.

Examples of the usable inactive solvent include an aliphatic hydrocarbon such as n-butane, n-pentane, isopentane, n-hexane, n-heptane and isooctane; an alicyclic hydrocarbon such as cyclopentene, cyclohexane, methylcyclopentane, methylcyclohexane and decaline; and an aromatic hydrocarbon such as benzene and toluene. Among them, the aliphatic hydrocarbon and the alicyclic hydrocarbon can be still used as the solvent inactive to the hydrogenation reaction. These solvent can be used solely or in combination of two or more kinds thereof and is usually used in a ratio of from 200 to 10,000 parts by weight to 100 parts by weight of the whole monomer to be used.

A polymerization accelerator or a randomizer may be used at the time of polymerizing the polymer blocks for preventing the formation of long chain of the same kind of the polymer block in each of the blocks. Particularly, a Lewis base compound can be used as the randomizer when the polymerization reaction is carried out by the anion polymerization.

Specific examples of the Lewis base compound, include an ether compound such as dimethyl ether, diethyl ether, diisopropyl ether, dibutyl ether, tetrahydrofuran, diphenyl ether, ethyleneglycol diethyl ether and ethyleneglycol methyl-phenyl ether, a tertiary amine compound such as tetramethylethylenediamine, trimethylamine, triethylamine and pyridine; an alkali metal alkoxide compound such as potassium-t-amyloxide and potassium-t-butylaoxide: and a phosphine compound such as triphenylphosphine. These Lewis base compounds can be use solely or in combination of two or more kinds thereof.

A know successive additional polymerization reaction method and coupling method are applicable as a method of forming the block copolymer by the living anion polymerization. In this embodiment, the successive additional polymerization reaction method is preferably applied.

When the block copolymer having the polymer blocks [A'] and [B'] is produced by the successive additional reaction, the process for forming the polymer block [A] and the process for forming the polymer block [B'] are successively and continuously carried out.

In concrete, the polymer block [A'] is obtained by polymerizing the monomer mixture [a'] in the inactive solvent in the presence of the living anion polymerization catalyst and then the monomer mixture b' is added to the reaction system and polymerization is continued to obtain a polymer block [B'] bonded with the polymer block [A']. Moreover, the monomer mixture a' is added according to necessity and polymerized to bond a polymer block [A'] for framing a triblock polymer and then the monomer mixture [b'] is further added and polymerized for bonding a polymer block [B'] to form a terablock polymer.

The resultant block copolymer is recovered by a known method such as a steam stripping method, a direct solvent removing method and an alcohol coagulation method. When the inactive solvent for the hydrogenation reaction is used in the polymerization reaction, the recovery of the block copolymer is not necessary because the polymer solution can be still used for the hydrogenation reaction.

Among the block copolymers each having the polymer block [A'] and the polymer block [B'] obtained by the above method (1), hereinafter referred to as pre-hydrogenation block copolymer, a block copolymer having the following repeating unit is preferred.

The polymer block [A'] constituting a preferable pre-hydrogenation block copolymer is a polymer block containing a repeating unit [4] represented by the following Formula 4 in an amount of 50 mole %.

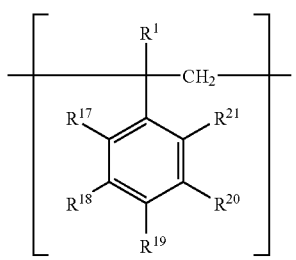

Formula 4

In Formula 4, $R^{16}$ is a hydrogen atom, an alkyl group having I to 20 carbon atoms, $R^{17}$ to $R^{21}$ are each independently a hydrogen atom, an alkyl group having 1 to 20 carbon atoms, a hydroxyl group, an alkoxy group having 1 to 20 carbon atoms or a halogen group.

A preferable polymer block [B'] is a polymer block which necessarily contains the repeating unit [4] and at least one of a repeating unit [5] represented by the following Formula 5 and a repeating unit [6] represented by the following Formula 6. When a molar fraction of the repeating unit [4] in the polymer block [A'] is a' and a molar fraction of the repeating unit [4] in the polymer block [B'] is b', the relation of a' and b' is a'>b'.

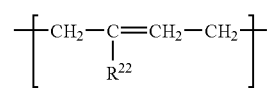

Formula 5

In Formula 5, $R^{22}$ is a hydrogen atom or an alkyl group having 1 to 20 carbon atoms.

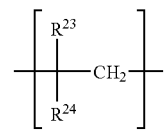

Formula 6

In Formula 6, $R^{23}$ is a hydrogen atom or an alkyl group having 1 to 20 carbon atoms and $R^{24}$ is a hydrogen atom or an alkyl group or an alkenyl group each having 1 to 20 carbon atoms.

Moreover, the block [B'] may contain a repeating unit [Y] represented by the following Formula Y.

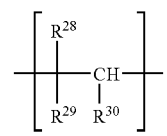

Formula Y

In Formula Y, $R^{28}$ is a hydrogen atom or an alkyl group having 1 to 20 carbon atoms, $R^{29}$ is a nitrile group, an alkoxycarbonyl group, a formyl group, a hydroxycarbonyl group or a halogen group, and $R^{30}$ is a hydrogen atom. $R^{29}$ and $R^{30}$ may be bonded with together for forming an acid anhydride or an imido group.

In the preferable pre-hydrogenation block copolymer, the ratio of (ma':nib') is from 5:95 to 95:5, more preferably from 30:70 to 95:5, and particularly preferably from 40:60 to 90:10 when the mole number of the whole repeating units constituting the block [A'] is ma' and that of the whole repeating unit constituting the block [B'] is mb'. The mechanical strength and the thermal resistivity are made superior when the ratio of (ma':mb') is within the above range.

The molecular weight of the preferable pre-hydrogenation block copolymer is from 12,000 to 400,000, more preferably from 19,000 to 350,000, and particularly preferably from 25,000 to 300,000 in terms of conversion Mw of polystyrene (or polyisoprene) measured by GPC using THF as the solvent. The mechanical strength is lowered when the Mw of block copolymer is too low, and the hydrogen adding ratio is lowered when the Mw is too high.

The molecular weight distribution of the pre-hydrogenation can be suitably selected according to the purpose of use and the ratio of Mw to Mn (Mw/Mn) in terms of Mw and Mn of polystyrene (or polyisoprene) measured by GPC is preferably not more than 5, more preferably not more than 4, and particularly preferably not more than 3. The hydrogen adding ratio is raised when the Mw/Mn is within the above ratio.

The Tg of the preferable pre-hydrogenation block copolymer may be suitably selected according to the purpose of the use, and the value on the high temperature side measured by DSC is preferably from 70 to 150° C., more preferably from 80 to 140° C., and particularly preferably from 90 to 130° C.

There is no limitation on the method and the type of reaction for hydrogenating the carbon-carbon unsaturated bond of the aromatic ring or cycloalkene ring and the unsaturated bond on the main chain or side chain of the pre-hydrogenation block copolymer, and the reaction may be carried out by a know method. A method capable of raising the hydrogenation ratio with inhibited polymer chain cleaving reaction is preferable and that reaction is carried out in an organic solvent using a catalyst containing at least one kind of metal selected from nickel, cobalt, iron, titanium, rhodium, palladium, platinum, ruthenium and rhenium for example. As the hydrogenation catalyst, both of an ununiform type catalyst and a uniform type catalyst are usable.

The ununiform type catalyst can be used in a state of metal compound it self or carrying on a suitable carrier. As the carrier, active carbon, silica, alumina, calcium carbide, titania, magnesia, zirconia, diatomite and silicon carbide are cited for example. The carrying amount of the catalyst is preferably form 0.01 to 80%, and more preferably from 0.05 to 60%, by weight.

As the uniform type catalyst, ones composed of a combination of a compound of nickel, cobalt, titanium or iron and an organic metal compound such as organic aluminum compound and an organic lithium compound, or an organic metal complex catalyst such as that of rhodium, palladium, platinum, ruthenium and rhenium are usable. As the compound of nickel, cobalt, titanium or iron, acetyl acetone salt, naphthate, cyclopentadienyl compound or cyclopentanedienyldichloro compound of each of the metals are usable. As the organic aluminum compound, an alkyl aluminum such as triethylalurninum and triisobutylalurninum, an aluminum halide such as diethylaluminum chloride and ethylaluminum dichloride and a hydrogenated alkylaluminum such as diisobutylaluminum halide are suitably usable.

As example of the organic metal complex, complexes of the above metals such as a γ-dichloro-π-benzene complex, a dichloro-tris(triphenylphosphine) complex and a hydride-chloro-triphenylphosphine complex are used. These hydrogenation catalyst can be used solely or in combination of two or more kinds of them, and the using amount of it is preferably from 0.01 to 100, more preferably from 0.05 to 50, and particularly preferably from 0.1 to 30, parts by weight to 100 parts by weight of the polymer.

The hydrogenation reaction is usually carried out at a temperature of from 10 to 250° C., and a temperature of from 50 to 200° C. is preferable and that from 80 to 180° C. is more preferable for raising the hydrogenation ratio and inhibiting the polymer cleaving reaction. The pressure of hydrogen is preferably from 0.1 to 30 MPa and more preferably from 1 to 20 MPa and particularly preferably from 2 to 10 MPa from the viewpoint of the above and the operation suitability.

The hydrogenation ratio of thus obtained block copolymer at the carbon-carbon unsaturated bond of the main chain and the side chain and the carbon-carbon unsaturated bond of the aromatic ring or cycloalkene ring is preferably not less than 90%, more preferably not less than 95%, and particularly preferably not less than 97% in the value measured by $H^1$ NMR. When the hydrogenation ratio is low, the double refractivity and thermal stability of the copolymer are lowered.

The block copolymer can be recovered after the hydrogenation reaction by a method in which the hydrogenation catalyst is removed from the reaction liquid by filtration or centrifugation and the solvent is directly removed by evaporation or a method in which the reaction liquid is poured into a poor solvent of the block copolymer to coagulate the polymer.

Specific examples of the alicyclic structure containing resin used in the present invention, include ZEONEX 340R, manufactured by Nihon Zeon Corporation.

As the method of adding the above compounding agent into the alicyclic structure containing resin to be used in the embodiment to prepare an alicyclic structure containing resin composition, for example, a method in which the block copolymer is melted and kneaded with the compounding agent by a mixer, biaxial kneader, rollers, brabender or extruder and a method in which the block copolymer and the compounding agent are dissolved in a suitable solvent and dispersed and then solidified are applicable. When the biaxial kneader is used, the polymer is usually extruded into a strand state and cut by a pelletizer into pellets for use.

An antioxidant may be contained in the above alicyclic structure containing resin.

As the antioxidant, a phenol type antioxidant, a phosphoric acid type antioxidant, and a sulk type antioxidant, are employable, and among them the phenol type antioxidant, and particularly an alkyl-substituted phenol type antioxidant are preferable. The coloring and the lowering in the strength of the formed product caused by the heating and the oxidation on the occasion of the formation can be prevented without any decreasing in the transparence and the anti-heating ability. As these antioxidants, for example antioxidants described in paragraphs 0071 to 0073 in Japanese Unexamined Patent Publication No. 2001-48924 may be preferably used.

These antioxidants may be employed singly or in combination of two or more kinds. The adding amount of the antioxidant is optionally decided within the range in which the object of the invention is not vitiated; it is usually from 0.001 to 5 parts by weight and preferably from 0.01 to 1 part by weight to 100 parts by weight of the polymer having the alicyclic structure.

In the embodiment, a resin composition containing the polymer having the alicyclic structure and at least one selected from the group consisting of (1) a soft polymer, (2) an alcoholic compound and (3) an organic or inorganic filler is employed. By adding such the additives, occurrence of white turbid caused by standing for a long period under a high temperature and high humidity condition can be prevented without degradation in properties such as the transparency, low moisture absorption and mechanical strength. Among the above-mentioned, (1) the soft polymer and (2) the alcoholic compound are excellent in the white turbid preventing effect and the transparency of the resin composition.

As such a soft polymer, compounds described in paragraphs 0077 to 0079 in Japanese Unexamined Patent Publication No. 2001-48924 may be preferably used, and as such an alcoholic compound, for example, compounds described in paragraphs 0080 to 0082 in the above Japanese Unexamined Patent Publication may be preferably used.

Although the adding amount of the compounds of (1) to (3) is decided by the combination of the polymer having the alicyclic structure and the compound to be added, the glass transition point and the transparency of the composition is largely lowered when the adding amount is too large in general. When the adding amount is too small, white turbid tends to occur under the high temperature and high humid condition so that the composition becomes unsuitable to use for the optical material.

The adding amount is usually from 0.01 to 10, preferably from 0.02 to 5, particularly preferably from 0.05 to 2, parts by weight to 100 parts by weight of the polymer having the alicyclic structure. When the adding amount is too small, the effect for preventing occurrence of the white turbid under the high temperature and high humidity condition cannot be obtained, and when the adding amount is too large, the heat resistivity and the transparency of the molded product are lowered.

Another compounding agent such as a UV absorbent, a light stabilizer, a near infrared absorbent, a colorant such as a dye and a pigment, a slipping agent, a plasticizer, an antistatic agent and a fluorescent whitening agent may be added to the alicyclic structure containing resin according to necessity. These additives may be employed singly or in a combination of two or more kinds thereof and the adding amount is optionally decided within the range in which the object of the invention is not vitiated.

Examples of a light resistance stabilizing agent include a benzophenone type light resistance stabilizing agent, a benzotriazole type light resistance stabilizing agent and a hindered amine type light resistance stabilizing agent, and, in this invention, preferably utilized are a hindered amine type light resistance stabilizing agent, from the viewpoint of transparency and an anti-coloring property of a lens.

Among hindered amine type light resistance stabilizing agents (hereinafter, abbreviated as a HALS), those having a polystyrene equivalent Mn, measured by means of GPC employing THF as a solvent, of preferably 1000-10000, more preferably 2000-5000 and most preferably 2800-3800. When Mn is excessively small, a predetermined amount may not be blended due to evaporation at the time of blending said HALS in a polymer by thermal fusion kneading, or foams and silver streaks may generate at the time of thermal fusion molding in the ejection molding, resulting in decrease of manufacturing stability.

Further, volatile gases may be generated from a lens when the lens is used for a long period keeping an on-state of a lamp. On the contrary, when Mn is excessively large, the dispersibility of HALS in a block copolymer is decreased to decrease transparency of a lens which results in deterioration of the improvement effect of light fastness. Therefore, in this invention, lenses exhibiting excellent manufacturing stability, low gas generation and transparency can be obtained by setting Mn of HALS in the above range.

The blending amount of UV absorbent and HALS described above in a block copolymer according to this invention is preferably 0.01-20 weight parts, more preferably 0.02-15 weight parts and most preferably 0.05-10 weight parts based on 100 weight parts of the polymer compound. The improvement effect of light fastness may not be obtained sufficiently resulting in coloring in such as the case of long period outdoor use, when the addition amount is excessively small. While, when the blending amount of HALS is excessively large, a part of the HALS may be converted to a gas to be generated, or dispersibility of the HALS may be decreased, resulting in decrease of transparency of a lens.

The abovementioned alicyclic structure containing resin can be obtained by suitably mixing the foregoing raw materials. The mixing method is not specifically limited as long as the additives can be satisfactorily dispersed in the hydrocarbon type polymer by the method. For example, a method in which the resin is kneaded in a molten form by a mixer, double-axial kneader, rollers, brabender or extruder and a method hi which the materials are dissolved in a suitable solvent and dispersed and solidified. When the double-axial kneader is employed, the molten mixture is usually extruded in a form of stick and cut into a suitable length by a strand cutter to form pellets for employing as the molding material.

According to the above scanning optical system 101, the scanning optical system 101 is adapted to satisfy the conditional formula: $0.05 \leq NA1 \cdot t1 \leq 1.5$, and the above plastic material is used for the first lens 6, whereby it become possible to prevent the first lens 6 from causing a white turbidity.

Further, the scanning imaging optical system 8 is adapted to satisfy the conditional formula: $0.05 \leq t2/f1 \leq 0.4$ and $f1 \geq 0$, the above plastic material is used for the second lens 7, and the scanning imaging optical system 8 is adapted to preferably satisfy the conditional formula: $0.1 \leq t2/f1 \leq 0.25$, whereby it become possible to prevent the second lens 7 from causing a white turbidity.

Further, the scanning imaging optical system 8 is adapted to satisfy the conditional formula: $0.25 \leq \Sigma d/f \leq 0.5$, whereby the entire body of the scanning imaging optical system 8 can be made in compact and the manufacturing cost can be suppressed. Moreover, the uneven thickness ratio between a central portion and a periphery portion in the first lens 6 and the second lens 7 can be minimized. Therefore, different from the case that the uneven thickness ratio is large, it becomes possible to prevent a light amount from becoming different for each imaging position, thereby preventing a resultant image from becoming uneven.

Herein, the present invention should not be interpreted so as to be limited to the above-mentioned embodiments, and of course, some alteration and modification may be possible suitably.

For example, in the above-mentioned embodiment, the light source device 1, a light source to emit one light flux was used. However, a light source to emit a plurality of light fluxes may be employed. In this case, since a plurality of lines can be written simultaneously at one scanning with the plurality of light fluxes, the speed of forming an image can be made faster. Further, as mentioned above, since a lens added with a light resistant agent is employed as the first lens 6 and the second lens 7, even if a plurality of light fluxes are irradiated to the same position at the same time, it becomes possible to prevent the lens from causing white turbidity.

Further, although it was explained that a diffractive structure may be provided on at least one optical surface of the first lens 6 and the second lens 7, the diffractive structure may be provided on an optical surface of the collimating lens 2 and the cylindrical lens 3 in the line image forming optical system 4. Further, the diffractive structure may be provided on an optical surface of another optical element arranged on an optical path separately from the above optical elements. However, such a diffractive structure is preferably arranged at a scanned surface H side rather than the deflecting optical system 5.

Figure 6:
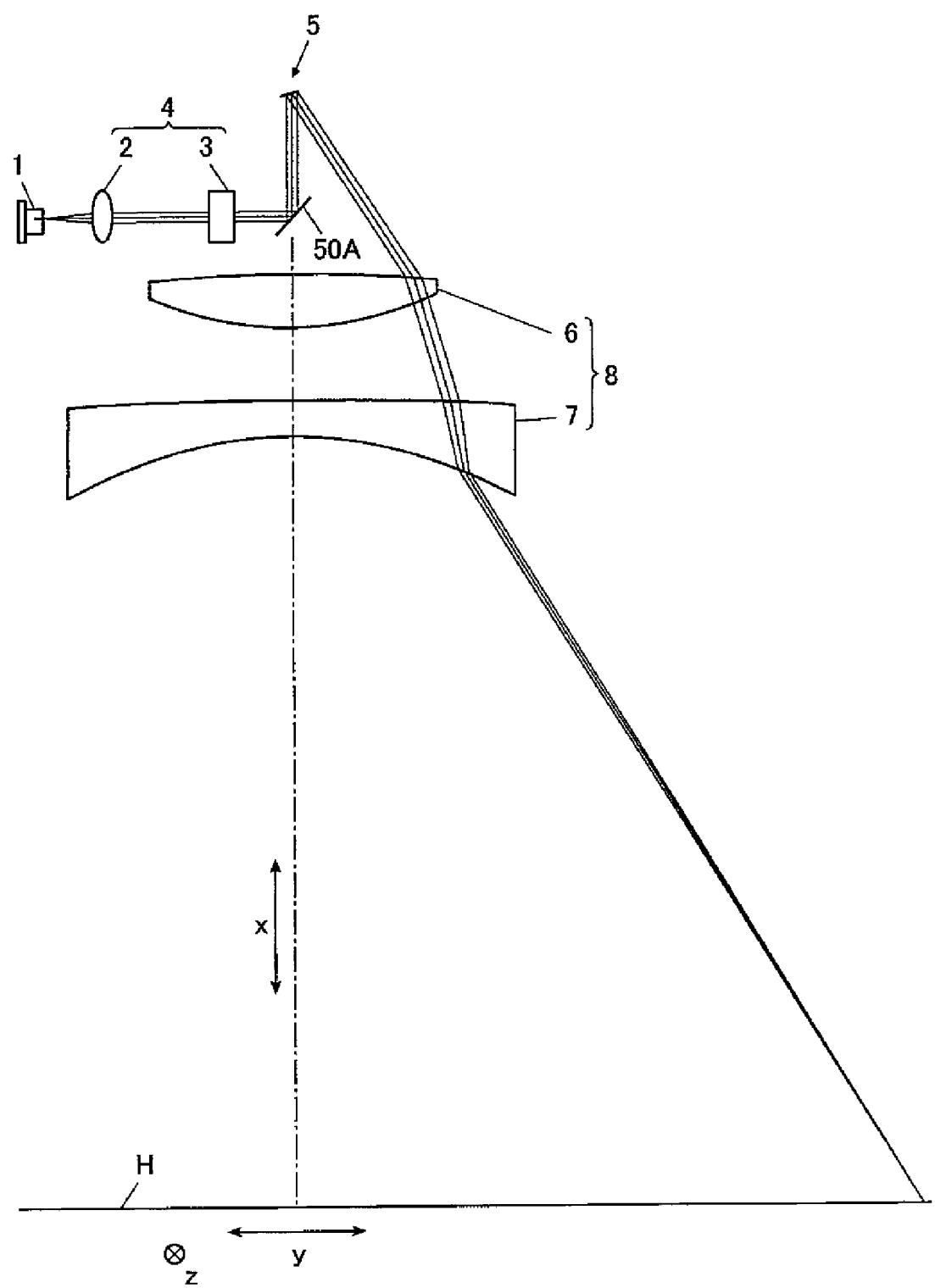
FIG. 6 is an outline structural view of the scanning optical system in Embodiment 4.
Figure 7:
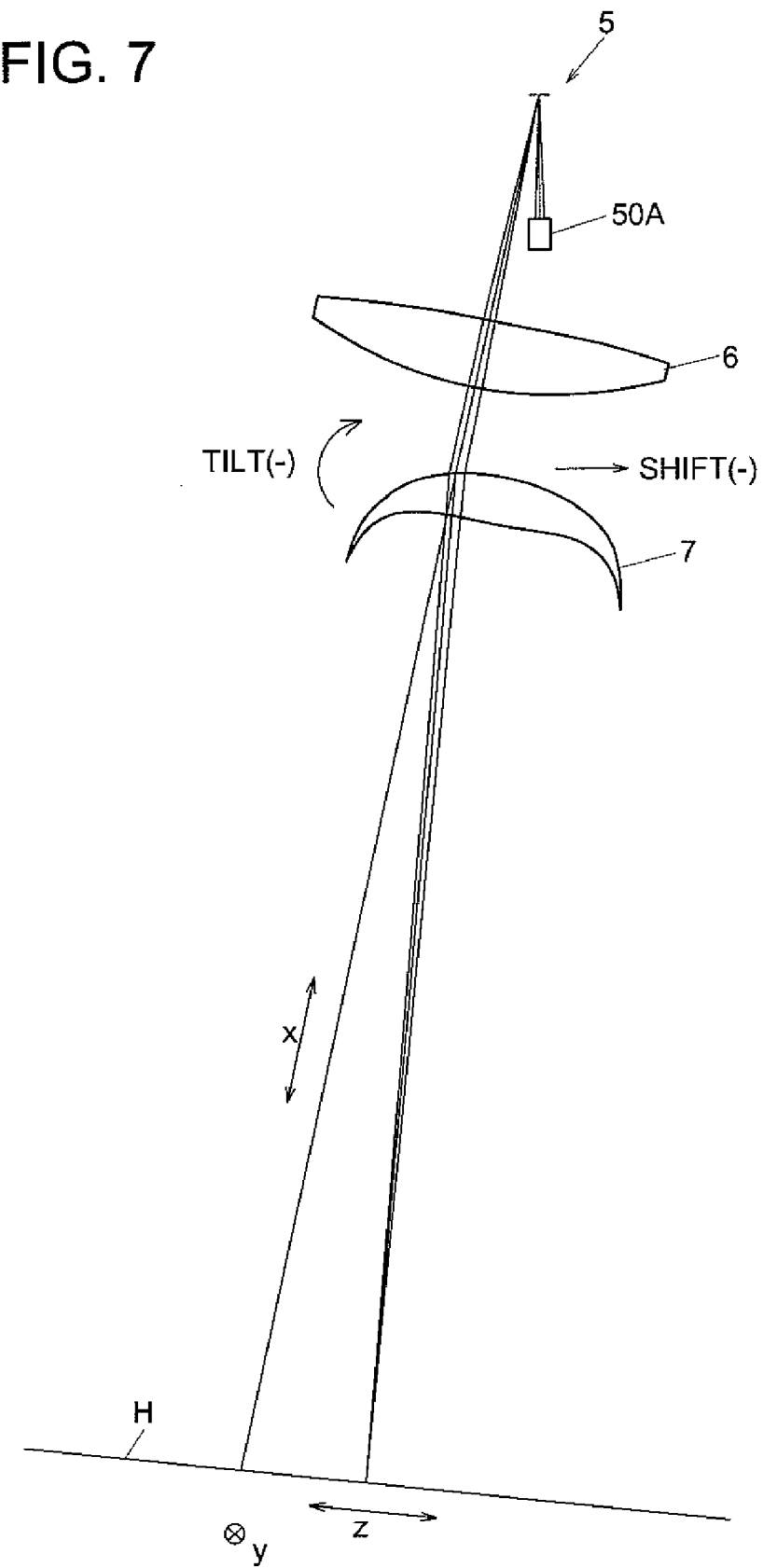
FIG. 7 is an outline structural view of the scanning optical system in Embodiment 4.

Furthermore, although it was explained that the deflecting optical system 5 deflects a light flux by a polygon mirror 50, a resonant mirror (mirror) 50A to make a reflecting surface to cause a sine oscillation, such as a galvanometer mirror, a MEMS mirror, etc. as shown in FIG. 6 and FIG. 7 mentioned later may be employed. Herein, in the case that such a resonant mirror 50A is employed for the deflecting optical system 5, there is a problem that, since an arcsin θ lens is generally used as a lens of the scanning imaging optical system 8, Na is different between a light flux passing a center portion of the lens and a light flux passing a peripheral portion of the lens, resulting in that a beam becomes fat in the main scanning direction y at a region where an image height is high. On the other hand, in order to rectify such fatness of a beam diameter, it is necessary to make a light flux slightly divergent in the main scanning direction y to enter the deflecting optical system 5 and to make a distance between the deflecting optical system 5 and the scanning imaging optical system 8 proper.

However, when a conventional light flux with a long wavelength is made to enter the deflecting optical system 5 as a divergent light flux, the beam diameter in the main scanning direction y at the time of entering becomes extremely large. Accordingly, a mirror of the deflecting optical system 5 becomes itself large. Therefore, this system is not proper for practical use in terms of control and cost. In this point, in the case that the above-mentioned resonant mirror 50A is used for the deflecting optical system 5, since the wavelength of a light flux is blue, the fatness of a beam diameter can be prevented without making the width of a beam large so much. Therefore, the fatness of a beam diameter can be prevented while employing the resonant mirror 50A of a practical use level.

Example

Subsequently, preferable embodiments of the present embodiment will be explained. Herein, the meanings of symbols used in the explanation are as follows.

λ Wavelength
n1 Refractive index of the first lens
n2 Refractive index of the second lens
t1 Gap [mm] from a polygon mirror to the first lens
d1 Thickness [mm] at the center portion of the first lens (refer to FIG. 2)
t2 Gap [mm] between the first lens and the second lens
d2 Thickness [mm] at the center portion of the second lens (refer to FIG. 2)
d3 Distance [mm] from the second lens last surface to an image field
T2 Tilt amount [degree] of the second lens around Z axis (refer to FIG. 3 (b))
S2 Shift amount [mm] of the second lens in y axis direction (refer to FIG. 3 (b))
f Focal length [mm] of the scanning imaging optical system in the main scanning direction
f1 Focal length [mm] of the first lens in the main scanning direction
NA1 Sine value of the polygon entering angle in the sub-scanning direction
Σd Gap [mm] from the deflecting optical system to the lens last surface (refer to FIG. 2)
R Radius of curvature
$R_0$ Radius of curvature of an anamorphic lens surface at the optical axis portion in a plane (cross sectional plane in the sub-scanning direction) vertical to the main scanning direction Further, in the following Tables, the number of powers of 10 (for example, $2.5 \times 10^{-02}$) is represented by the use of E (for example, 2.5E-02).

Example (1)

As the scanning optical system of Example (1), what is shown in the following Table 1 was produced.

TABLE 1

| Symbol | Data |
| --- | --- |
| λ | 405 nm |
| n1 | 1.52524 |
| n2 | 1.52524 |
| t1 | 40 mm |
| d1 | 10 mm |
| t2 | 89 mm |
| d2 | 6 mm |
| d3 | 238 mm |
| T2 | 0.33° |
| S2 | 0.06 mm |
| f | 320 mm |
| NA1 | 0.01726 |
| NA1 × t1 | 0.69037 |
| t2/f1 | 0.31101 |
| Σd/f | 0.45313 |

Here, as a base resin material of the first lens 6 and the second lens 7, ZEONEX340R (a product name produced by Nippon Zeon) excellent in light resistance was used The specific configuration of the first lens 6 and the second lens 7 was made into an aspheric surface configuration represented by the following Formula (iii) and Table 2. The unit of the values in the table is [mm].

$$x = \frac{h^2/R}{1 + \sqrt{1-(K+1)h^2/R^2}} + A_4 h^4 + A_6 h^6 + A_8 h^8 + A_{10} h^{10} + A_{12} h^{12} \quad \text{(iii)}$$

In the Formula (iii), h represents a distance [mm] in the Y axis direction in FIG. 3(b), K represents a conic constant, and each of $A_4, A_6, A_8, A_{10}$ and $A_{12}$ represents an aspheric surface coefficient.

TABLE 2

| | | First lens | | Second lens | |
| --- | --- | --- | --- | --- | --- |
| | | First surface* | Second surface** | Third surface*** | Fourth surface** |
| Main scanning direction | R | −54.16449 | −42.34767 | −253.53 | −329.86227 |
| | K | 0 | −2.35857E−01 | 0 | 2.49523E+01 |
| | $A_4$ | 0 | 1.61647E−07 | 3.8707E−08 | −1.37010E−08 |
| | $A_6$ | 0 | 9.41594E−11 | −5.1302E−12 | 9.46146E−12 |
| | $A_8$ | 0 | −1.30220E−13 | 3.1636E−15 | 6.06087E−15 |
| | $A_{10}$ | 0 | 1.62995E−16 | 6.1516E−19 | −4.55909E−19 |
| | $A_{12}$ | 0 | 0 | −4.5659E−22 | 0 |
| Sub-scanning direction | $R_0$ | | | 57.429 | |

*Rotationally symmetric spherical surface
**Rotationally symmetric aspherical surface
***Anamorphic surface

Example (2)

As the scanning optical system of Example (2), what is shown in the following Table 3 was produced.

TABLE 3

| Symbol | Data |
| --- | --- |
| λ | 405 nm |
| n1 | 1.52524 |
| N2 | 1.52524 |
| t1 | 40 mm |
| d1 | 10 mm |
| t2 | 74 mm |
| d2 | 6 mm |
| d3 | 204 mm |
| T2 | 0.63° |
| S2 | 0.23 mm |
| f | 280 mm |
| NA1 | 0.01539 |
| NA1 × t1 | 0.61569 |
| t2/f1 | 0.31886 |
| Σd/f | 0.46429 |

Here, as a base resin material of the fast lens 6 and the second lens 7, ZEONEX340R (a product name produced by Nippon Zeon) excellent in light resistance was used Further, the specific configuration of the first lens 6 and the second lens 7 was made into an aspheric surface configuration represented by the above Formula (iii) and the following Table 4. The unit of the values in the table is [mm].

TABLE 4

| | | First lens | | Second lens | |
| --- | --- | --- | --- | --- | --- |
| | | First surface* | Second surface** | Third surface*** | Fourth surface** |
| Main scanning direction | R | −61.69518 | −43.24896 | −131.74 | −174.89728 |
| | K | 0 | −4.17275E−01 | 0 | 1.340005 |
| | $A_4$ | 0 | −8.33079E−08 | −1.5126E−07 | −2.96845E−07 |
| | $A_6$ | 0 | 4.33600E−11 | −1.3405E−11 | −3.81517E−12 |
| | $A_8$ | 0 | −1.32606E−13 | −1.4768E−15 | −3.01010E−15 |
| | $A_{10}$ | 0 | 6.80507E−17 | −3.3985E−18 | −1.63169E−18 |
| | $A_{12}$ | 0 | 0 | 2.1401E−22 | 0 |
| Sub-scanning direction | $R_0$ | | | 58.090 | |

*Rotationally symmetric spherical surface
**Rotationally symmetric aspherical surface
***Anamorphic surface

Example (3)

As the scanning optical system of Example (3), what is shown in the following Table 5 was produced.

TABLE 5

| Symbol | Data |
| --- | --- |
| λ | 405 nm |
| n1 | 1.52524 |
| N2 | 1.52524 |
| t1 | 40 mm |
| d1 | 10 mm |
| t2 | 49 mm |
| d2 | 6 mm |
| d3 | 247 mm |
| f | 280 mm |
| NA1 | 0.01539 |
| NA1 × t1 | 0.61569 |
| t2/f1 | 0.19363 |
| Σd/f | 0.375 |

Here, as abase resin material of the first lens 6 and the second lens 7, ZEONEX340R (a product name produced by Nippon Zeon) excellent in light resistance was used. Further, the specific configuration of the first lens 6 was made into a configuration represented by the above Formula (iii) and the following Table 6. That is the configuration of the first lens 6 was made, in the main scanning direction, into an aspheric surface configuration which can be expressed with the function up to the 10th order and was made, in the sub-scanning direction, into a spherical surface configuration which changes in an image height direction continuously. The unit of the values in the table is [mm].

Further, the specific configuration of the second lens 7 was made into a configuration represented by the above Formula (iii) and the following Table 6. That is, the configuration of the second lens 7 was made, in the main scanning direction, into an aspheric surface configuration which can be expressed with the function up to the 12th order and was made, in the sub-scanning direction, into a configuration which changes in an image height direction continuously.

In this second lens 7, on the assumption that $R_0$ represents a radius of curvature of a cross sectional plane in the sub-scanning direction on the optical axis, $CCj$ (j=1, 2, ..., 10) represents a curvature radius determining coefficient of a cross sectional plane in the sub-scanning direction, and Y represents a distance from the optical axis in the main scanning direction, a curvature radius r' of a cross sectional plane in the sub-scanning direction is represented by the following formula (iv).

$$r' = R_0(1 + CC1\,Y + CC2\,Y^2 + CC3\,Y^3 + \ldots + CC10\,Y^{10}) \quad \text{(iv)}$$

In this Formula (Iv), when the value of the coefficient CCj in the formula is made different between the light source device 1 side and the opposite side (refer to FIG. 2) in terms of the reference axis X in a plane parallel to the main scanning direction y, the value of r' represents a left-right asymmetric surface configuration.

Specifically, at the light source side, it becomes:

$$r' = R_0(1 + C_2 Y^2 + C_4 Y^4 + C_6 Y^6 + C_8 Y^8 + C_{10} Y^{10}), \text{ and}$$

at the light source counter side, it becomes:

$$r'' = R_0(1 + D_2 Y^2 + D_4 Y^4 + D_6 Y^6 + D_8 Y^8 + D_{10} Y^{10}) \text{ (refer to FIG. 5).}$$

With this, the second lens 7 is made a left-right asymmetric surface configuration in terms of the reference axis X.

Figure 5:
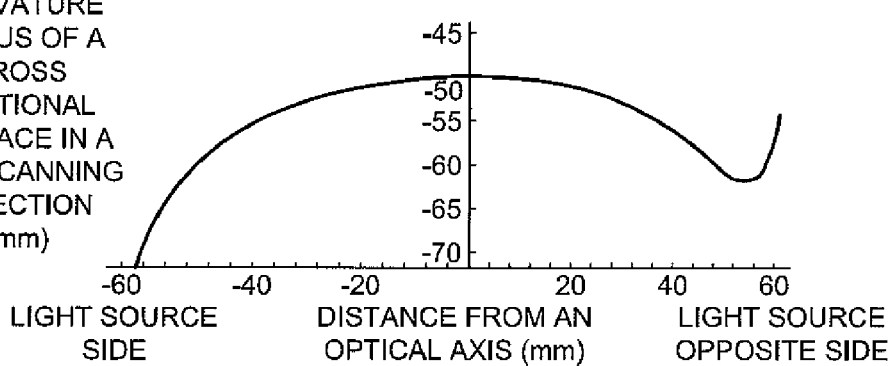
FIG. 5 is a drawing showing a relationship between a radius of curvature in a cross sectional plane vertical to a sub-scanning direction of the second lens and a distance from an optical axis.

Further, in the case that the above second lens 7 is employed for the scanning optical system shown in the above Table 5, the relationship between a curvature radius in a cross sectional plane vertical to the sub-scanning direction z and a distance from the optical axis becomes as shown in FIG. 5.

TABLE 6

|  |  | First lens | | Second lens | |
|---|---|---|---|---|---|
|  |  | First surface* | Second surface** | Third surface*** | Fourth surface** |
| Main scanning direction | R | 40.49764 | 33.67970 | 215.54577 | 259.61483 |
|  | K | 0 | −4.65355E−01 | −49.68873 | 1.86605 |
|  | $A_4$ | 0 | 2.92802E−08 | −2.77859E−07 | 2.65783E−07 |
|  | $A_6$ | 0 | 2.21891E−10 | 1.03978E−10 | 2.96976E−11 |
|  | $A_8$ | 0 | 3.42866E−14 | −2.95735E−14 | −6.82854E−15 |
|  | $A_{10}$ | 0 | 9.19917E−17 | 7.72192E−18 | 2.81305E−18 |
|  | $A_{12}$ | 0 | 0 | −6.73190E−22 | 0 |
| Sub-scanning direction | $R_0$ | 0 | 0 | −49.68870 | 0 |
|  | $C_4$ | 0 | 0 | 3.90996E−05 | 0 |
|  | $C_6$ | 0 | 0 | 4.30160E−08 | 0 |
|  | $C_8$ | 0 | 0 | −2.80017E−11 | 0 |
|  | $C_{10}$ | 0 | 0 | 1.34266E−14 | 0 |
|  | $C_{12}$ | 0 | 0 | −2.42693E−18 | 0 |
|  | $D_4$ | 0 | 0 | 5.18232E−05 | 0 |
|  | $D_6$ | 0 | 0 | 1.75995E−08 | 0 |
|  | $D_8$ | 0 | 0 | 4.45274E−12 | 0 |
|  | $D_{10}$ | 0 | 0 | −4.83990E−15 | 0 |
|  | $D_{12}$ | 0 | 0 | 1.32863E−18 | 0 |

*Rotationally symmetric spherical surface
**Rotationally symmetric aspherical surface
***Left-right asymmetric anamorphic surface

Example (4)

As the scanning optical system of Example (4), what is shown in FIG. 6, FIG. 7 and the following Table 7 was produced. In the table, T2' represents a tilt amount of the second lens around the Y axis (refer to FIG. 7), and S2' represents a shift amount of the second lens in the direction of the z axis (refer to FIG. 7).

TABLE 7

| Symbol | Data |
|---|---|
| λ | 405 nm |
| n1 | 1.52524 |
| n2 | 1.52524 |
| t1 | 52.6 mm |
| d1 | 16.5 mm |
| t2 | 18.7 mm |
| d2 | 11 mm |
| d3 | 223 mm |
| T2' | 0.49° |
| S2' | −9.4 mm |
| f | 202.505 mm |
| NA1 | 0.02111 |
| NA1 × t1 | 1.11126 |
| t2/f1 | 0.15130 |
| Σd/f | 0.48807 |

Here, as shown in FIG. 6, FIG. 7, in the scanning optical system in this embodiment, the deflecting optical system 5 has a pair of resonant mirrors 50A to cause the sine oscillation of reflecting mirrors, and the scanning imaging optical system 8 corrects aberration such that a laser light beam deflected by the resonant mirrors 50A scans at a constant velocity on a scanned surface H. Moreover, this scanning optical system makes a light flux to enter the deflecting optical system 5 from an oblique direction in a vertical plane in the sub-scanning direction z and from an approximate front side in a vertical plane in the main scanning direction y and the second lens 7 is made eccentric from the reference axis X Herein, in FIG. 7, an illustration of a line image forming optical system 4 is omitted in order to simplify the drawing.

Further, as a base resin material of the first lens 6 and the second lens 7, ZEONEX340R (a product name produced by Nippon Zeon) excellent in light resistance was used. Furthermore, the specific lens configuration of the first lens 6 and the second lens 7 was made in a free curved surface lens (YZ polynomial expression surface) represented by the following formula (v) and Table 8 so as to correct a scanning line curvature and an image field curvature in good order while keeping a uniform beam diameter and an equal velocity scanning ability on a scanned surface H.

$$x = \frac{h^2/R}{1+\sqrt{1-(1+K)(h/R)^2}} + \sum_{j=2}^{\infty} C_j y^m z^n \quad (v)$$

$$j = 1 + [(m+n)^2 + m + 3n]/2$$

In Formula (v), $C_j$ is a coefficient of $y^m z^n$, specifically, $C_j$ becomes values shown in the following Table 9. Further, in, n are arbitrary natural numbers (however, m+n≦10).

TABLE 8

|  |  | First lens | | Second lens | |
|---|---|---|---|---|---|
|  |  | First surface* | Second surface* | Third surface** | Fourth surface** |
| Main scanning direction | R | −356.72984 | 78.09197 | 189.47417 | −492.21258 |
|  | K | −71.967824 | −1.07758 | −1.01222 | −8.52652E−02 |
|  | $A_4$ | −7.50562E−08 | −8.29524E−08 | 0 | 0 |
|  | $A_6$ | −5.01046E−11 | −5.13259E−11 | 0 | 0 |
|  | $A_8$ | 1.28276E−14 | −1.21082E−14 | 0 | 0 |
|  | $A_{10}$ | 3.08994E−18 | 2.43224E−18 | 0 | 0 |
|  | $A_{12}$ | −3.61937E−22 | 2.61221E−21 | 0 | 0 |

TABLE 8-continued

|  |  | First lens | | Second lens | |
|---|---|---|---|---|---|
|  |  | First surface* | Second surface* | Third surface** | Fourth surface** |
| polynomial expression surface coefficient | $C_4$ | 0 | 0 | −2.23876E−03 | −3.03880E−03 |
|  | $C_6$ | 0 | 0 | −1.22152E−02 | 2.09609E−03 |
|  | $C_{11}$ | 0 | 0 | −3.70386E−07 | −1.52816E−07 |
|  | $C_{13}$ | 0 | 0 | −9.28591E−07 | −1.74303E−06 |
|  | $C_{15}$ | 0 | 0 | −5.75900E−06 | −5.63180E−06 |
|  | $C_{22}$ | 0 | 0 | 6.67270E−12 | 4.21170E−12 |
|  | $C_{24}$ | 0 | 0 | 7.14010E−11 | 9.12110E−11 |
|  | $C_{26}$ | 0 | 0 | −5.76390E−10 | −4.79570E−10 |
|  | $C_{28}$ | 0 | 0 | 4.84380E−09 | 2.95930E−09 |
|  | $C_{37}$ | 0 | 0 | 5.19770E−15 | 2.25939E−15 |
|  | $C_{39}$ | 0 | 0 | 3.58416E−15 | 3.31361E−15 |
|  | $C_{41}$ | 0 | 0 | 1.28206E−13 | 1.61262E−13 |
|  | $C_{43}$ | 0 | 0 | 1.27600E−12 | 4.68179E−13 |
|  | $C_{45}$ | 0 | 0 | −1.16870E−11 | −1.26610E−11 |

*Rotationally symmetric aspherical surface
**Free curved surface (YZ polynomial expression surface)

TABLE 9

| Coefficient | Term |
|---|---|
| $C_4$ | $y^2$ |
| $C_6$ | $z^2$ |
| $C_{11}$ | $y^4$ |
| $C_{13}$ | $y^2 z^2$ |
| $C_{15}$ | $z^4$ |
| $C_{22}$ | $y^6$ |
| $C_{24}$ | $y^4 z^2$ |
| $C_{26}$ | $y^2 z^4$ |
| $C_{28}$ | $z^6$ |
| $C_{37}$ | $y^8$ |
| $C_{39}$ | $y^6 z^2$ |
| $C_{41}$ | $y^4 z^4$ |
| $C_{43}$ | $y^2 z^6$ |
| $C_{45}$ | $z^8$ |

Example (5)

As the scanning optical system of Example (5), what is shown in the following Table 10 was produced.

TABLE 10

| Symbol | Data |
|---|---|
| λ | 405 nm |
| n1 | 1.52524 |
| n2 | 1.52524 |

TABLE 10-continued

| Symbol | Data |
|---|---|
| t1 | 15 mm |
| d1 | 10 mm |
| t2 | 120 mm |
| d2 | 6 mm |
| d3 | 208.36 mm |
| T2 | 0.007° |
| S2 | 0.008 mm |
| f | 320 mm |
| NA1 | 0.01148 |
| NA1 × t1 | 0.1722 |
| t2/f1 | 0.45666 |
| Σd/f | 0.47188 |

Here, as shown in Table 10, in this example, the value of NA1×t1 is adapted to satisfy the conditional formula:

$$0.05 \leq NA1 \cdot t1 \leq 1.5.$$

Further, as a base resin material of the first lens 6 and the second lens 7, ZEONEX340R (a product name produced by Nippon Zeon) excellent in light resistance was used. Furthermore, the specific lens configuration of the first lens 6 and the second lens 7 was made in an aspheric surface configuration represented by the above Formula (ii) and the following Table 11. Here, the unit of values in the table is [mm].

TABLE 11

|  |  | First lens | | Second lens | |
|---|---|---|---|---|---|
|  |  | First surface* | Second surface** | Third surface*** | Fourth surface** |
| Main scanning direction | R | 42.81729 | 35.30766 | 52.32509 | 59.80870 |
|  | K | 0 | −0.85247 | 0 | −0.65336 |
|  | $A_4$ | 0 | 2.58689E−06 | −3.56300E−07 | 3.20853E−07 |
|  | $A_6$ | 0 | −1.86743E−09 | 5.59695E−10 | 2.90669E−10 |
|  | $A_8$ | 0 | 1.11718E−11 | −5.92394E−13 | −1.29940E−13 |
|  | $A_{10}$ | 0 | −3.66965E−15 | 2.54604E−16 | 3.77489E−17 |
|  | $A_{12}$ | 0 | 0 | −4.68801E−20 | 0 |
| Sub-scanning direction | $R_0$ |  |  | −180.00 |  |

*Rotationally symmetric spherical surface
**Rotationally symmetric aspherical surface
***Anamorphic surface

Comparative Example (1)

As the scanning optical system of Comparative Example (1), what is shown in the following Table 12 was produced.

TABLE 12

| Symbol | Data |
|---|---|
| λ | 405 nm |
| n1 | 1.52524 |
| n2 | 1.52524 |
| t1 | 10 mm |
| d1 | 10 mm |
| t2 | 60.2 mm |
| d2 | 6 mm |
| d3 | 311.3 mm |
| T2 | 0.03° |
| S2 | 0.29 mm |
| f | 320 mm |
| NA1 | 0.002 |
| NA1 × t1 | 0.02 |
| t2/f1 | 0.18454 |
| Σd/f | 0.26934 |

Here, as shown in Table 12, in this Comparative Example (1), the value of NA1×t1 is adapted not to satisfy the conditional formula:

$$0.05 \leq NA1 \cdot t1 \leq 1.5.$$

Further, as a base resin material of the first lens 6 and the second lens 7, ZEONEX340R (a product name produced by Nippon Zeon) excellent in light resistance was used. Furthermore, the specific lens configuration of the first lens 6 and the second lens 7 was made in an aspheric surface configuration represented by the above Formula (ii) and the following Table 13. Here, the unit of values in the table is [mm].

TABLE 13

| | | First lens | | Second lens | |
|---|---|---|---|---|---|
| | | First surface* | Second surface** | Third surface*** | Fourth surface** |
| Main scanning direction | R | 27.5291 | 26.68457 | 73.73514 | 74.28949 |
| | K | 0 | −6.58723E−01 | 0 | 1.29329 |
| | $A_4$ | 0 | 2.81167E−06 | 3.60540E−07 | 1.73676E−07 |
| | $A_6$ | 0 | 1.51360E−09 | 7.62706E−10 | 4.43803E−10 |
| | $A_8$ | 0 | −2.53880E−11 | −1.23159E−12 | −7.08573E−13 |
| | $A_{10}$ | 0 | 1.61802E−13 | 9.71130E−16 | 4.34163E−16 |
| | $A_{12}$ | 0 | 0 | −8.44657E−20 | 0 |
| Sub-scanning direction | $R_0$ | | | −62.26707 | |

*Rotationally symmetric spherical surface
**Rotationally symmetric aspherical surface
***Anamorphic surface

[Evaluation of Examples (1) Through (5) and Comparative Example (1)]

Tests in terms of white turbidity were conducted for the first lens 6 and the second lens 7 of each of the above Examples (1) through (5) and Comparative Example (1).

Specifically, in Examples (1) through (5) and Comparative Example (1), irradiation was conducted for 5000 hours with a laser output of 30 mW by the use of a blue semiconductor CW laser with a wavelength of 405 nm under the environment with a temperature of 80° C.

Thereafter, the appearance of each of the lenses in Examples (1) through (5) and Comparative Example (1) was visually observed, and in addition, the transmittance before and after the irradiation was evaluated. The results are shown in Table.

TABLE 14

| | Cloudiness by visual check | Transmittance (relative value to that of before irradiation) % |
|---|---|---|
| NA1 · t1 = 0.69 (Example (1)) | Nonexistence | 95 |
| NA1 · t1 = 0.62 (Example (2)) | Nonexistence | 95 |
| NA1 · t1 = 0.62 (Example (3)) | Nonexistence | 95 |
| NA1 · t1 = 1.11 (Example (4)) | Nonexistence | 97 |
| NA1 · t1 = 0.17 (Example (5)) | Nonexistence | 90 |
| NA1 · t1 = 0.02 (Comparative Example (1)) | Existence | 70 |

As shown in this table, in Examples (1) through (5), the lenses did not cause white turbidity, and was transparent Further, the transmittance was also almost the similar value with that of before irradiation in Examples (1) through (4). On the other hand, in Comparative Example (1), the lenses already caused white turbidity and were looked cloudy. Further, the transmittance was lowered by about 30% as compared with that of before irradiation.

The invention claimed is:

1. A scanning optical system, comprising:

a light source to emit a light flux with a wavelength of 500 nm or less, a deflecting optical system to deflect the light flux from the light source so as to scan in a main scanning direction on a surface, and a scanning imaging optical system to converge the light flux deflected by the deflecting optical system on the scanned surface, wherein the scanning imaging optical system comprises a first plastic lens provided to adjoin the deflecting optical system and satisfies the following conditional formula:

$$0.05 \leq NA1 \cdot t1 \leq 1.5$$

where a numerical aperture of a light flux entering the deflecting optical system in a sub-scanning direction is NA1 and a distance between the deflecting optical system and the first plastic lens is t1 [mm]; and wherein the first plastic lens is mainly composed of an alicyclic structure containing resin which contains a repeating unit [1] represented by the following Formula (1):

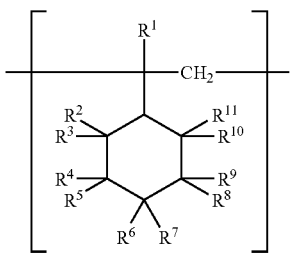

Formula (1)

in the Formula 1, $R^1$ represents a hydrogen atom or an alkyl group having a carbon number of 1 to 20, $R^2$ to $R^{11}$ each independently represents a hydrogen atom, an alkyl group having a carbon number of 1 to 20, a hydroxyl group, an alkoxy group having a carbon number of 1 to 20 or a halogen group.

2. The scanning optical system described in claim 1, wherein the scanning imaging optical system satisfies the following conditional formula:

$0.1 \leq NA1 \cdot t1 \leq 1$.

3. The scanning optical system described in claim 1, further comprising:
a second plastic lens located near a scanned surface than the first plastic lens, wherein the second plastic lens is mainly composed of the alicyclic structure containing resin and the scanning imaging optical system satisfies the following conditional formula:

$0.05 \leq t2/f1 \leq 0.4$ and $f1 \leq 0$ where a focal length of the first plastic lens in a main scanning is f1 [mm] and a gap between the first plastic lens and the second plastic lens is t2 [mm].

4. The scanning optical system described in claim 3, wherein the scanning imaging optical system satisfies the following conditional formula:

$0.1 \leq t2/f1 \leq 0.25$.

5. The scanning optical system described in claim 3, wherein at least one of the first plastic lens and the second plastic lens has a cross sectional surface which is parallel to the main scanning direction and is asymmetric in terms of right and left.

6. The scanning optical system described in claim 5, wherein the first plastic lens has the cross sectional surface which is parallel to the main scanning direction and is asymmetric in terms of right and left.

7. The scanning optical system described in claim 3, wherein at least one of the first plastic lens and the second plastic lens has a diffractive structure provided on at least one optical surface thereof.

8. The scanning optical system described in claim 3, wherein the second plastic lens has an anamorphic surface on at least one side thereof.

9. The scanning optical system described in claim 1, wherein the scanning imaging optical system satisfies the following conditional formula:

$0.25 < \Sigma d/f \leq 0.5$ where a focal length of the entire system of the scanning imaging optical system in the main scanning direction is f [mm] and a distance from the deflecting optical system to an optical surface of the scanning imaging optical system positioned closest to a scanned surface is $\Sigma d$ [mm].

10. The scanning optical system described in claim 1, further comprising:
an optical element having a diffractive structure provided on at least one optical surface thereof.

11. The scanning optical system described in claim 1, wherein the first plastic lens is a positive meniscus lens with a concave surface facing the deflecting optical system.

12. The scanning optical system described in claim 1, wherein the light source is a light source to emit two or more light fluxes.

13. The scanning optical system described in claim 1, wherein the deflecting optical system includes a resonant mirror which causes a sine oscillation on a reflecting surface so as to deflect a light flux from the light source.

14. The scanning optical system described in claim 1, wherein the alicyclic structure containing resin is mainly composed of a block polymer which includes a polymer block [A] containing the repeating unit [1] represented by the Formula (1) and a polymer block [B] containing the repeating unit [1] represented by the Formula (1) and a repeating unit [2] represented by the following Formula (2) and/or a repeating unit [3] represented by the following Formula (3), wherein a molar fraction "a" (mole %) of the repeating unit [1] in the polymer block [A] and a molar fraction "b" (mole %) of the repeating unit [1] in the polymer block [B] satisfy the following conditional formula: a>b;

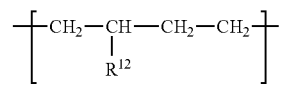

Formula 2 in the Formula 2, $R^{12}$ represents a hydrogen atom or an alkyl group having a carbon number of 1 to 20, and

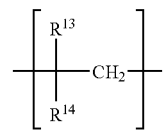

Formula 3 in the Formula 3, $R^{13}$ and $R^{14}$ each independently represents a hydrogen atom or an alkyl group having a carbon number of 1 to 20.

15. The scanning optical system described in claim 14, wherein the alicyclic structure containing resin contains a light resistance stabilizing agent.

16. A light beam scanning device, comprising:
the scanning optical system described in claim 1.

17. An image forming apparatus, comprising:
the light beam scanning device described in claim 16.

* * * * *